US012798125B2

(12) United States Patent
Wood et al.

(10) Patent No.: US 12,798,125 B2
(45) Date of Patent: Nov. 17, 2026

(54) ROBOTIC GRASPING VIA ENTANGLEMENT

(71) Applicant: President and Fellows of Harvard College, Cambridge, MA (US)

(72) Inventors: Robert J. Wood, Cambridge, MA (US); Kaitlyn Becker, Somerville, MA (US); Nicholas Charles, Cambridge, MA (US); Clark Teeple, Somerville, MA (US); Lakshminarayanan Mahadevan, Cambridge, MA (US)

(73) Assignee: President and Fellows of Harvard College

( * ) Notice: Subject to any disclaimer, the term of this patent is extended or adjusted under 35 U.S.C. 154(b) by 867 days.

(21) Appl. No.: 18/297,131

(22) Filed: Apr. 7, 2023

(65) Prior Publication Data

US 2023/0321849 A1 Oct. 12, 2023

Related U.S. Application Data

(60) Provisional application No. 63/328,762, filed on Apr. 8, 2022.

(51) Int. Cl.

*B25J 15/12* (2006.01)
*B25J 9/16* (2006.01)

(Continued)

(52) U.S. Cl.

CPC ............. *B25J 15/12* (2013.01); *B25J 9/1612* (2013.01); *B25J 15/0023* (2013.01); *B25J 15/10* (2013.01)

(58) Field of Classification Search

CPC ... B25J 9/104; B25J 9/1045; B25J 9/14; B25J 9/142; B25J 9/144; B25J 9/146;

(Continued)

(56) References Cited

U.S. PATENT DOCUMENTS 6,718,766 B2 * 4/2004 Seto ........................ F15B 15/18 92/48
9,492,930 B2 * 11/2016 Galloway ................ B25J 15/12

(Continued)

FOREIGN PATENT DOCUMENTS

WO WO-2019191286 A1 * 10/2019 .............. B25J 1/142
WO WO-2024127688 A1 * 6/2024 ............ B25J 13/086

OTHER PUBLICATIONS

Robert J. Wood, et al., "Grasping via Entanglement," Research Square (Apr. 20, 2021).

(Continued)

*Primary Examiner* — Joshua E Rodden
(74) *Attorney, Agent, or Firm* — Modern Times Legal; Robert J. Sayre

(57) ABSTRACT

A soft-robotic grasper includes a plurality of elongated, entangling filaments having a length-to-thickness ratio of at least 20. The grasper can include a manifold that includes an inlet port and a plurality of outlet ports in fluid communication with the outlet ports, wherein each elongated filament is coupled in fluidic communication with a respective outlet port of the manifold, wherein each elongated filament defines an interior hollow channel into which a pressurized fluid can be pumped through the respective outlet port with which it is coupled, wherein each elongated filament is mechanically programmed to undergo a curling displacement when pressurized fluid is pumped into its interior hollow channel, and wherein the elongated filaments are spaced and configured to entangle with one another when displaced via the pumping of the pressurized fluid into the interior hollow channels of the elongated filaments.

19 Claims, 18 Drawing Sheets

(51) Int. Cl.
*B25J 15/00* (2006.01)
*B25J 15/10* (2006.01)

(58) Field of Classification Search
CPC . B25J 9/148; B25J 9/161; B25J 9/1612; B25J 15/0009; B25J 15/0023; B25J 15/0233; B25J 15/0286; B25J 15/08; B25J 15/083; B25J 15/086; B25J 15/10; B25J 15/103; B25J 15/106; B25J 15/12; B25J 18/06; B65G 47/90; G05B 2219/40234
USPC .............................................. 294/119.3, 213
See application file for complete search history.

(56) References Cited

U.S. PATENT DOCUMENTS

| | | | | |
|---|---|---|---|---|
| 10,137,580 | B1 * | 11/2018 | Cobb | B25J 19/0075 |
| 10,173,328 | B2 * | 1/2019 | Lessing | F15B 15/103 |
| 10,184,500 | B2 * | 1/2019 | Galloway | F15B 15/103 |
| 10,518,423 | B2 * | 12/2019 | Curhan | B25J 15/12 |
| 12,145,259 | B2 * | 11/2024 | Lessing | B25J 15/0023 |
| 2014/0314976 | A1 * | 10/2014 | Niiyama | G06F 3/0488 428/34.3 |
| 2017/0097021 | A1 * | 4/2017 | Ilievski | B25J 9/1075 |
| 2019/0217481 | A1 * | 7/2019 | Lessing | B25J 15/0023 |
| 2020/0391391 | A1 * | 12/2020 | Curhan | B25J 15/12 |
| 2023/0405843 | A1 * | 12/2023 | Lessing | B25J 15/10 |
| 2025/0050512 | A1 * | 2/2025 | Oono | B25J 15/12 |

OTHER PUBLICATIONS

Robert J. Wood, et al., "Grasping via Entanglement, Supplementary Information" Research Square (Apr. 20, 2021).
Nina R. Sinatra, et al., "Ultragentle Manipulation of Delicate Structures Using a Soft Robotic Gripper," 4 Science Robotics 1-11 (Aug. 28, 2019).
Kaitlyn Becker, et al., "Mechanically Programmable Dip Molding of High Aspect Ratio Soft Actuator Arrays," 30 Advanced Functional Materials 1908919 (Jan. 29, 2020).
Kaitlyn Becker, et al., "Mechanically Programmable Dip Molding of High Aspect Ratio Soft Actuator Arrays, Supporting Information," 30 Advanced Functional Materials 1908919 (Jan. 29, 2020).
Changsheng Li, et al., "A Cable-Driven Flexible Robotic Grasper with Lego-Like Modular and Reconfigurable Joints," 22 IEEE/ASME Transactions on Mechatronics 2757-2767 (Dec 13, 2017).
Shouhei Shirafuji, et al., "Development of a Tendon-Driven Robotic Finger for Anthropomorphic Robotic Hand," 33 The International Journal of Robotics Research 677-693 (Feb. 19, 2014).
Daniel M. Aukes, et al., "Simulation-Based Tools for Evaluating Underactuated Hand Designs," 2013 IEEE International Conference on Robotics and Automation (May 2013).

* cited by examiner

ROBOTIC GRASPING VIA ENTANGLEMENT

RELATED APPLICATION

This application claims the benefit of U.S. Provisional Application No. 63/328,762, filed 8 Apr. 2022, the entire content of which is incorporated herein by reference.

GOVERNMENT SUPPORT

This invention was made with government support under Grant Nos. 1830901, 1922321, 2011754, and 1556164, awarded by the National Science Foundation (NSF), and under Grant No N00014-17-1-2063, awarded by the U.S. Office of Naval Research (NAVY/ONR). The Government has certain rights in the invention.

BACKGROUND

The discussion of the background state of the art, below, may reflect hindsight gained from the disclosed invention(s); and these characterizations are not necessarily admitted to be prior art.

Securely grasping an object typically requires some knowledge of its size, shape, and mechanical properties. This act of grasping is done, seemingly without effort, by elephants whose trunks can pick up a peanut or uproot a tree within their reach, or orangutans whose combination of reaching and grasping allows them to brachiate rapidly in a complex arboreal environment. In the engineered world of robotic grasping, inspired primarily by the remarkable dexterity of the human hand, much work has focused on understanding the mechanics, dynamics, and control of graspers as they interact with target objects. One common approach is to study how the form and stiffness of the grasper (relative to that of the target) determines the number (topology), shape (geometry), and magnitude (mechanics) of contacts and associated stresses, while also improving the sensing of the target. This has led to a hand-centric design paradigm where robotic graspers take the form of an articulated set of locally controlled rigid links, while also relying on an opto-motor feedback loop linking perception, planning, and action to achieve a grasping goal. Modern rigid graspers show great promise with many controllable degrees of freedom and embedded sensors, but can present challenges for grasp planning and control in the presence of uncertainty, or with complex target geometries.

More recently, the introduction of compliant elements and under-actuated control into otherwise-rigid fingers provides a form of mechanical intelligence that drastically reduces the planning and control requirements for successful grasping. These graspers are exemplified by having a small number of degrees of freedom associated with the distal portions and a series of proximal joints that are soft and can thus allow increased adaptability of contact configurations with the target. This concept of strategic compliance is further extended in fully soft robotic digits, utilizing soft materials throughout the entire digit structure to enable digits to conform to a wider variety of objects. Fully soft graspers circumvent precise feedback control and instead rely on mechanical deformation at multiple scales, both distally and proximally. Devolving some of the mechanical complexity of a grasping task to morphology and passive mechanics and dynamics leads to conformable contact that, even in the absence of feedback, is adaptable and robust to a range of variations in the target shape, size, and properties, and robust to damage in soft, passive, end-effectors. However, this still leaves open the question of how to grasp objects that are geometrically and topologically complex, and mechanically heterogeneous, e.g., plants, produce, fragile marine fauna, or many human-made devices. Additionally, in existing approaches for soft robotic grasping, increased compliance and conformality of grasping may be delivered at the cost of grasp strength, payload capacity, and/or the robustness of the grasper.

SUMMARY

A soft-robotic grasper and methods for its use in grasping objects are described herein, where various embodiments of the apparatus and methods may include some or all of the elements, features, and steps described below.

A soft-robotic grasper comprises a manifold that includes an inlet port, a plurality of outlet ports in fluid communication with the outlet ports, and a plurality of elongated filaments, each elongated filament having a length-to-thickness ratio of at least 20. Each elongated filament is coupled in fluidic communication with a respective outlet port of the manifold, and each elongated filament defines an interior hollow channel into which a pressurized fluid (e.g., gas or liquid) can be pumped through the respective outlet port with which it is coupled. Moreover, each elongated filament is mechanically programmed to undergo a curling displacement when pressurized fluid is pumped into its interior hollow channel, and the elongated filaments are spaced and configured to entangle with one another when displaced via the pumping of the pressurized fluid into the interior hollow channels of the elongated filaments.

Alternatively, the curling motions of a compliant, high-aspect-ratio actuator can be achieved via tendon/cable drives, e.g., as shown in FIGS. 22 and 23. The curling motion can also be induced by a differential expansion or contraction of multiple materials that may be driven by heat, moisture, light-sensitive liquid crystal materials, electroactive polymers, or other shape-changing forces. These alternative forms of the actuator can otherwise share the same features and properties of the fluid-actuated actuators and can likewise be used in the same methods for grasping via entanglement, though the elongated filaments in these additional embodiments can extend from a base without needing a manifold for partitioning fluid flow.

A method for grasping objects via entanglement of an array of elongated filaments utilizes the above-described soft-robotic grasper. The soft-robotic grasper is positioned such that the elongated filaments contact an external object. Where the grasper is fluid-driven, a fluid is pumped through the inlet port of the manifold and out the outlet ports of the manifold into the interior hollow channels of the elongated filaments coupled with the outlet ports, the elongated filaments curling and mutually entangling with one another while grasping the external object. The soft-robotic grasper with the external object grasped by the mutually entangled elongated filaments can then displace the external object.

Figure 1:
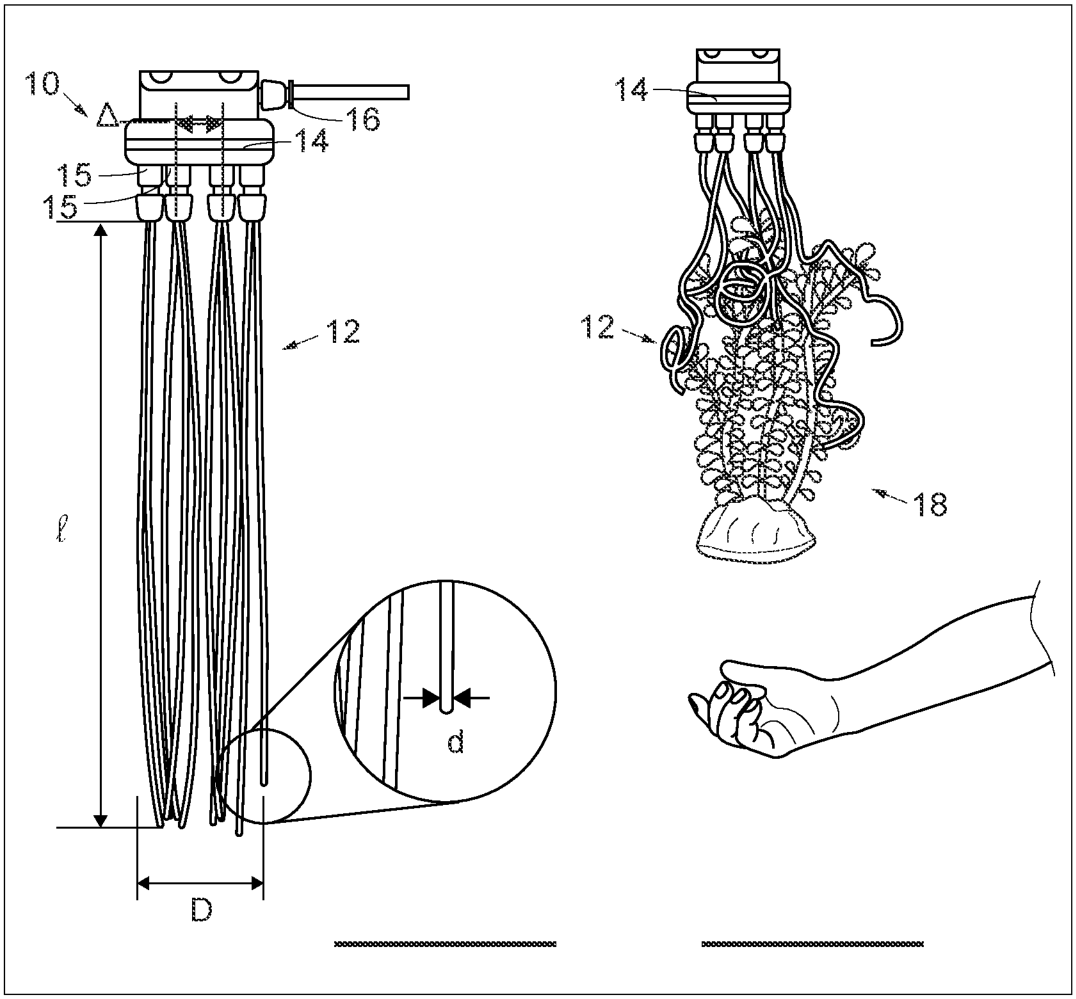
FIG. 1 shows an entangling filament grasper 10 featuring 12 hollow elastomeric filaments 12 extending from a manifold 14 via outlet ports 15 and including a pressure inlet port 16, wherein the filaments 12 are in a resting state (unpressurized) at left and pneumatically actuated [subject to a pressurized (or evacuated) atmosphere inside the filaments] around a house plant 18 at right.

In the accompanying drawings, like reference characters refer to the same or similar parts throughout the different views. The drawings are not necessarily to scale; instead, an emphasis is placed on illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used, or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly)

pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," can mean within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

Some of the terminology used herein is for the purpose of describing particular implementations and is not intended to limit more generic exemplifications of the invention. As used herein, singular forms, such as those introduced with the articles, "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video, or audio form) for assembly and/or modification by a customer to produce a finished product.

Presented herein is a grasping strategy for complex shapes via the collective entanglement of and by an array of actuated filaments. The basic unit of this array is a slender (e.g., with a length-to-thickness ratio greater than 10 or at least 20, 30, 40, or 50 or more) hollow elastomeric filament that is pneumatically actuated to form a highly curved structure. The multiple self and mutual contact interactions between the filaments and the object create a randomly tangled spatial assemblage that enables a soft conformable grasp. This soft conformable grasp is realized using a grasper enabled by a new fabrication method to create inexpensive and modular arrays of fluidically actuated (e.g., via pressurized gas or liquid) elastomeric filaments. We demonstrate that a collective of highly compliant filamentous actuators is capable of a soft, adaptable grasp across a range of loads that vary in size, shape, and geometric and topological complexity without any feedback. Overall, this grasping approach adapts to the mechanical, geometric, and topological complexity of target objects via an uncontrolled, spatially distributed, and heterogeneous scheme without perception or planning, in sharp contrast with current deterministic feedback-driven robotic grasping methods.

Here, the topological, geometrical, and mechanical flexibility afforded by slender pneumatically actuated filaments is leveraged to realize a grasping strategy capable of adapting to the topological, geometric, and mechanical complexity of a range of target objects even in the absence of perception, planning, or feedback control. The basic building block of this strategy can be in the form of a slender elastomeric filament with an eccentric hole running axially (sealed at one end). These filaments can be made using a dip-coating technique.

These filaments operate in a manner similar to that of plant tendrils and robotic mimics thereof but are much faster owing to the rapidity of pneumatic actuation relative to growth- or shrinkage-driven tendrils and tendril-bots. Dip-molding methods, described below and shown in FIGS. 15-19, allow for cheap, easy, and uniform construction of large arrays of actuators with a high aspect ratio (up to 200:1) for compliance, sufficient length for intertwining and engaging with target objects, and a sufficiently high actuation bandwidth for grasping tasks.

A summary of mechanical programming methods that we successfully demonstrated with a dip-coating process, using, e.g., liquid silicone rubber, is shown in FIGS. 15-19, wherein measured cross-sections of sample actuators are also shown; in each of these Figures, the scale bar represents 1 mm. These dimensions are from a small sample set and thus do not represent the dimensions of the full design space of the actuators made with the dip-coating method but are meant to help illustrate patterns and distinctions between the various mechanical programming strategies. One such pattern is that the gravity angle programmed methods (illustrated in FIG. 15) showed the greatest differential in wall thickness within a single actuator. By contrast, the wall-thickness differential in the electric-field (shown in FIG. 16) and gravity-droplet (shown in FIG. 17) formation strategy methods are very low.

Figure 15:
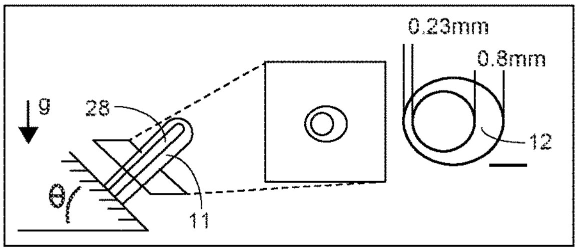
FIG. 15 shows the mechanical programming of an actuator filament 12 via gravity angle curing, wherein the filament 12 is formed at an angle, θ, wherein the coating drifts to the lower side of the pin 28 to produce greater wall thickness on the underside of the filament 12.
Figure 16:
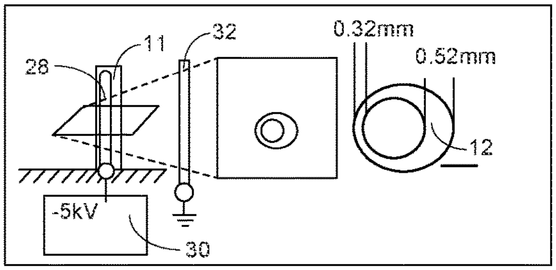
FIG. 16 shows mechanical programming of an actuator filament 12 via application of an electric field during filament formation, wherein the electric field introduces a net charge in the coated pin 28. The electrically conductive pin 28 is connected to a power supply **3*o*, and a nearby grounding electrode 32 is used to attract the mass of the liquid coating off-center with respect to the axis of the pin 28**.
Figure 17:
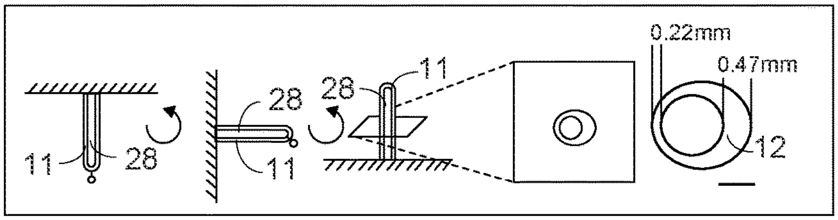
FIG. 17 shows mechanical programming of an actuator filament 12 via gravity droplet formation, wherein a droplet is formed at the tip of an inverted open-faced mold shortly after dip coating. The mold is then rotated 90°, and the liquid coating shifts to one side of the pin 28. The mold is then fully reverted such that the pin 28 is pointing upward; and the droplet(s) run(s) down the side of the pin 28, leaving a thicker coating on one side of the pin 28.
Figure 18:
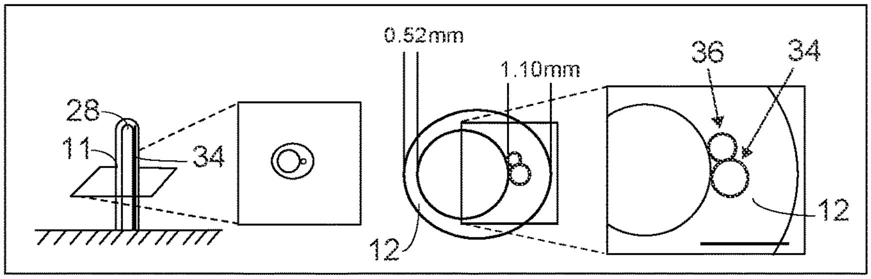
FIG. 18 shows mechanical programming of an actuator filament 12 via inclusion of a fiber 34 on one side of the pin 28. Encasing one or more fibers 34 into the side wall of the filaments causes asymmetric stretching of the actuator when internally pressurized, thereby inducing a bending motion. In the image shown, a bubble 36 formed next to the fiber 34.

The use of gravity (shown in FIG. 15) as a mechanical programming method may be best suited for unidirectional actuation, but it is also the least complex and least labor-intensive of the strategies presented herein. As depicted in FIG. 15, an open-face mold in the form of a pin 28 that has been dipped in a liquid 11, such as liquid silicone rubber, that forms the filament 12. The pin 28 is propped at an angle with respect to gravity during the curing process to transform the liquid 11 into the solid filament 12. As a result, more of the liquid 11 drifts to the lower side of the pin 28, creating a thickness bias in the side wall of the resulting filament 12, which is shown at right here and in the following drawings. When pressurized, the actuator filaments 12 will thus bend in the direction of the lower side because the thinner side wall inflates and stretches more than the thicker side. Given its simplicity, this method is convenient for constructing large arrays of actuator filaments as well as the construction of very high aspect ratio actuator filaments.

The electric-field method (shown in FIG. 16) for mechanical programming makes use of static electricity to introduce a net charge into the liquid-dipped pin 28. The pin 28 is connected to a high-voltage power supply 3*o* and a nearby grounding electrode 32 is used to attract the mass of the liquid 11 (e.g., silicone rubber) off-center with respect to the axis of the pin 28.

The gravity-droplet strategy (shown in FIG. 17) uses gravity to create a structural bias in the open-molding process by using droplets of the liquid 11 formed at the tip of an inverted pin 28 shortly after dip coating. The pin 28 is then rotated 90°, causing the liquid 11 (e.g., liquid silicone) droplets to shift to one side of the pin tip. The pin 28 is then fully reverted such that the pin 28 is pointing upward; and the droplets then run down one side of the pin 28, leaving a thicker coating of the liquid 11 on one side.

In the case of the fiber-inclusion strategy (shown in FIG. 18), wherein one or more fibers 34 is/are encased into the side wall of the filament 12, causing asymmetric stretching of the filament 12 when internally pressurized, thereby inducing a bending motion. The filament 12 can be formed by lightly tacking one or more fibers 34 onto the open-mold pin 28 prior to inserting the pin 28 into the mold form for dip coating. When the open-face mold pin 28 is dip coated or poured over and the liquid 11 (e.g., silicone rubber) cures on the pin 28 to form the solid filament 12, the fiber(s) 34 is/are mechanically incorporated into the side wall of the filament 12 and releases from the pin 28 when the mold assembly is removed. Due to surface tension, a side effect of positioning the fiber 34 on the side of the pin 28 is that the wall thickness of the filament 12 formed thereon is greater on the fiber side of the filament 12, though the strain limitation of the fiber 34 creates a more significant effect on the bending motion of the filament 12 than does the wall-thickness variation.

Figure 19:
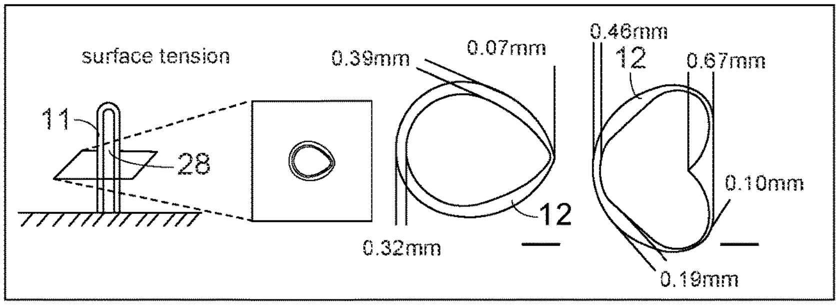
FIG. 19 shows mechanical programming of an actuator filament via surface tension. The bending motion is determined by biasing wall thickness via the use of pins 28 with noncircular cross-sections. The cross-sectional profile of the pins 28 is designed to leverage passive effects of surface tension on the liquid silicone to create thick and thin portions in the coating that forms the filament 12.

The two exemplary cross-sections of the surface-tension programming strategy shown in FIG. 19 also exhibit unique distributions of thickness in that there are more abrupt, almost discrete, transitions between thick and thin portions of the side wall of the filament 12. Similar to programming the bending motion of an actuator filament 12 with fiber inclusions, the use of surface tension as a mechanical programming strategy allows for arbitrary arrangement of bending directions within an array of actuator filaments. The bending motion is determined by biasing the wall thickness of the filaments 12 via the use of pins 28 with noncircular cross-sections. The cross-sectional profile of the pins 28 is designed to leverage passive effects of surface tension on the liquid 11 (e.g., liquid silicone) to create thick and thin portions in the coating. The interior profile of the filament 12 is defined by the shape of the pin 28 while the exterior profile of the pin coating will tend toward a cross-section that minimizes the overall surface area, owing to surface tension acting on the liquid 11. The pin geometry can thus be used to create thicker sections of the filament 12 where liquid 11 fills into concave surfaces of the pin 28, and thinner sections of the filament 12 around features that protrude further and have tighter convex curvatures than neighboring features. We explored pin designs that focus on the creation of thick and thin features and found that designs that leveraged convex protrusions to create thinner wall sections were more successful at achieving a bending motion through differential wall stiffness and greater curvature at lower actuation pressures.

This eccentricity can be further exaggerated with different pin designs, though the thickness differential created using surface tension cannot continue to increase with successive dip coatings. The absolute difference between the thick and thin sections of the filament 12 increases with successive dips for the gravity and electric-field strategies but decreases for the fiber and surface-tension strategies. Furthermore, while the fiber strain-limited actuators continue to function with an increased number of dips and overall thickness, as do the electric-field and gravity-programmed actuators to a degree, the surface-tension strategy may be limited to creating relatively thin actuators of one or two coatings with the current silicone rubber and pins 28 used in these examples.

Figure 2:
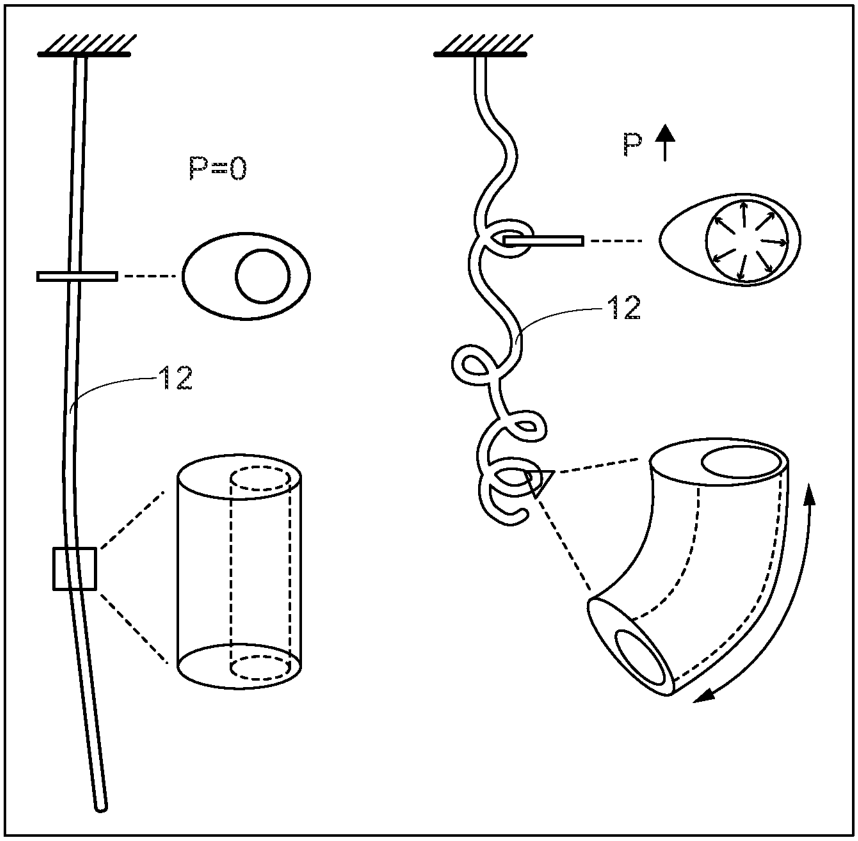
FIG. 2 is a schematic illustration of filaments 12 at ambient (at left) and at increased (at right) internal pressure.
Figure 3:
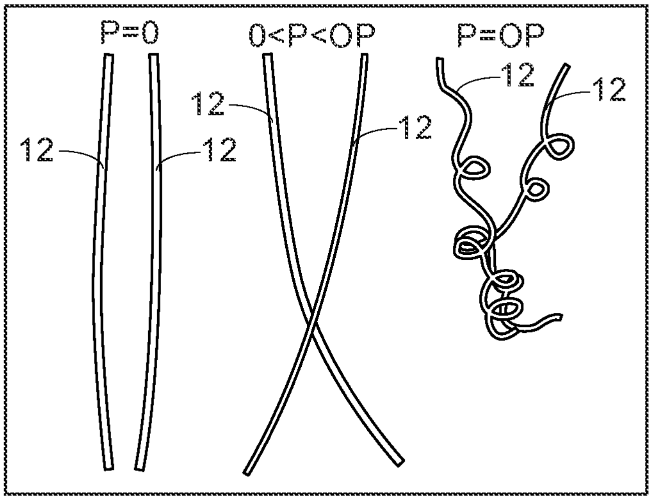
FIG. 3 is a schematic illustration of filaments 12 intertwining.

The configuration shown in FIG. 1 and used in the experiments below uses 12 300-mm long filaments distributed in a 50-mm diameter circle and connected to a single positive pressure source via tubing extending from the pressure inlet 16 of the manifold 14, but this design can easily be modified. The scale bars in FIGS. 1, 4, 5, and 8 represent a distance of 10 cm. When an individual filament is pneumatically or hydraulically actuated, it bends because of the eccentricity of the internal chamber defined by the filament 12, as shown in FIG. 2. This eccentricity enables an individual filament 12 to hang straight down under ambient pressure, form a slight curve and approach nearby filaments at low pressures, and then snap into a high-curvature state to form soft distributed contact zones either with a target object 18 (e.g., the plant in FIG. 1), itself or other filaments 12 as it reaches its elevated operational pressure, as shown in FIG. 3, which is a schematic illustration of filaments 12 intertwining. The filaments 12 start out mostly straight when hanging under gravity, develop a slight curve at low pressure and then snap to a tightly curled shape with increased pressure, close to the operating pressure (OP). The operating pressure can be tuned via fabrication methods described by Becker, et al., "Mechanically Programmable Dip Molding of High Aspect Ratio Soft Actuator Arrays," 30 Adv. Funct. Mater. 1908919 (2020), and is set to 25 psi (172 kPa) in this work.

For a single filament 12 of radius, r; length, l; hole radius, $r_h$; hole eccentricity, εr, ε∈[0; 1], elastic modulus, E; in an array with a characteristic spacing, d, actuated by a pressure, p, the design space of the grasper made of the same filaments is spanned by the following dimensionless parameters: grasper filament areal density, $\Phi_g=r^2/d^2<<1$, a scaled pressure, p/E, and finally the geometric arrangement of the filaments denoted by a scalar, S. Additionally, if we also vary the length, internal radius, and eccentricity of the filament 12, we can control l/r; δ, and ε. Finally, moving from terrestrial to aquatic environments, provides an additional parameter, $l/l_g$, where $l_g=(Er^2=g)^{1/3}$ is a gravitational length, with Δp being the difference in the density between the filament material and the ambient medium. Here, we will focus primarily on varying the grasper areal density of the filaments, $\Phi_G$, for simplicity, recognizing that there is a vast range of possibilities for further exploration. An object to be grasped, on the other hand, can be characterized by its size, $R_t$, the topological complexity of its branching structure, which we capture in a simplified form using its effective volumetric density, $\Phi_t$, within a convex hull around the object, and finally its mass density, $\rho_t$, that determines the object weight, $$\rho_t R_t^3 g.$$

The efficacy of the grasper is a function of its topological and geometrical complexity as well as that of the target and is a function of these dimensionless parameters.

Figure 4:
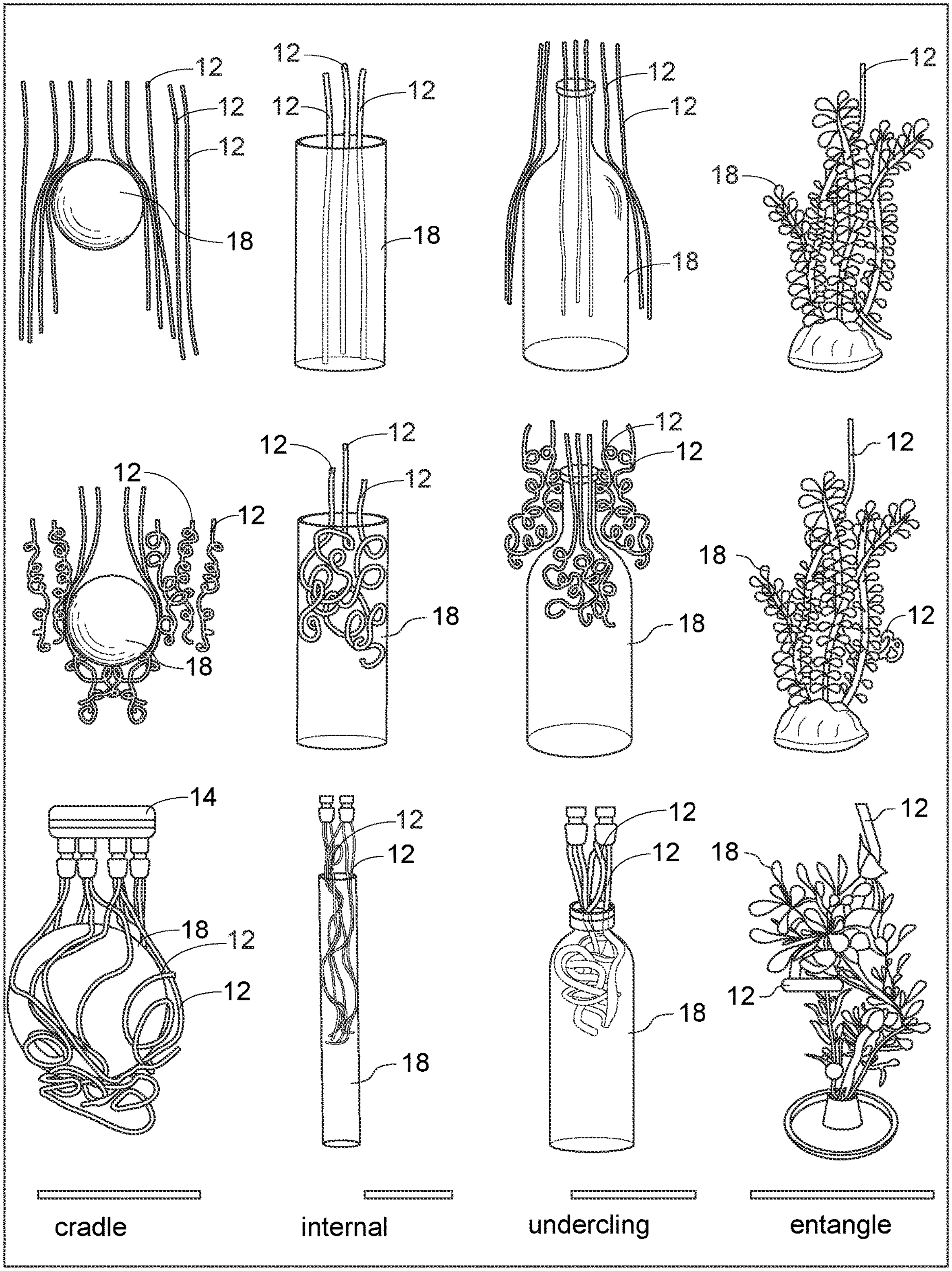
FIG. 4 shows how the final shape of the actuated filaments 12 and their resulting grasp is affected by interactions with the object 18 being grasped, wherein filaments 12 are illustrated in unactuated (top) and actuated states (middle and bottom) in the presence of objects 18 in the form of a sphere (at far left), tube (second from left), bottle (second from right), and artificial plant (far right).
Figure 5:
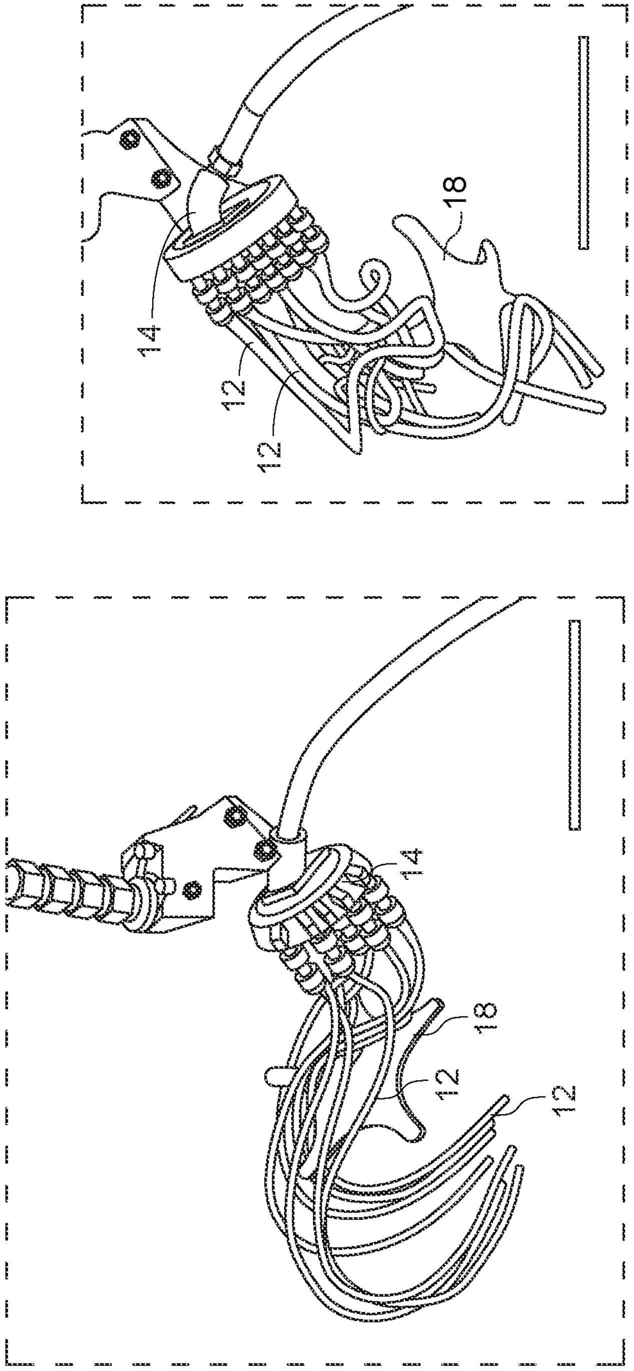
FIG. 5 shows that the filaments 12 can also be operated hydraulically and can operate under high hydrostatic pressure—in this case, from a field test in which a starfish 18 is grasped at Boo m under water.

The collective behavior of a large number of curling and twisting filaments 12 allows them to entangle with neighboring filaments 12 as well as with a target object 18 and thus drape, cradle, or conform to it as a function of the actuation pressure, as shown in FIG. 4. This collective behavior further enhances the ability of an actuated array of filaments 12 to grasp complex objects without perception, planning, or feedback, merely as a consequence of their compliance and stochastic interactions. In FIG. 4, we show both a schematic and a physical realization of how an array of such filaments 12 can be on, around, and in a range of target objects 18, such as spheres, cylinders, and corals, and can grasp them via collective entanglement, highly compliant individually, but capable of substantial stiffness collectively, akin to a tangled lock of hair that is much stiffer than an individual strand. The simplest grasps, as with the sphere, bear some resemblance to traditional grasping, whereas higher degrees of entanglement represent a larger departure from traditional grasping. The efficacy of this collective entanglement-based grasp is evident in FIG. 1, where we show how the array of filaments 12 can lift a potted plant by entangling with its complex arrangements of shoots and leaves; additionally, as shown in FIG. 5, it can lift a starfish from the ocean floor.

The advantages associated with using the collective entanglement of structurally soft individual filaments 12 eliminate the dependence on planning and perception prior to grasping. Simple actuation leads to robust grasping through randomly distributed soft contacts wherein no individual filament 12 is critical, but they collectively work for greater cumulative engagement and entanglement with other filaments 12, the target object 18, or a combination of both. This strategy thus works well in situations that are specifically challenging to traditional soft and rigid grasping strategies, e.g., in grasping of topologically complex, compliant, and delicate structures ranging from fragile house plants to deep-sea corals, bottles, tubes, tools, and irregularly shaped toys. The notion of static equilibrium for stable grasping is very different for the simple contacts typical of deterministic grasping compared to the present case of redundant soft distributed contacts.

Figure 6:
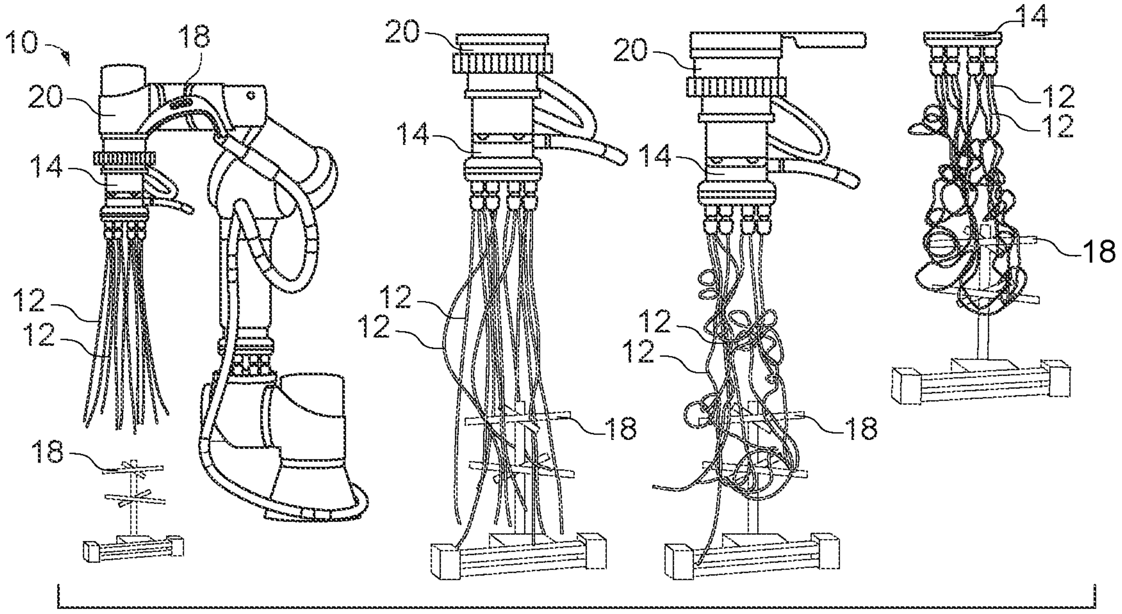
FIGS. 6-8 show typical pick-and-place operations for an object 18 with each of the following three approach trajectories: top-drape (FIG. 6), side-drape (FIG. 7), and plop-on-top (FIG. 8).
Figure 7:
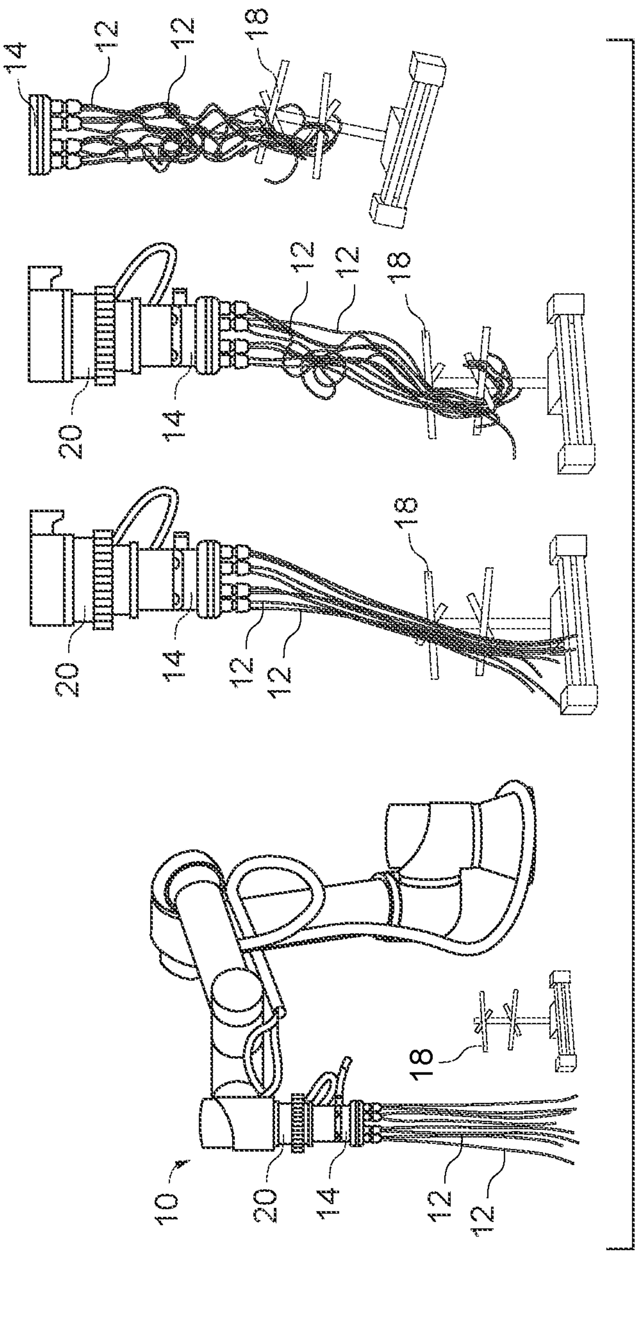
Figure 8:
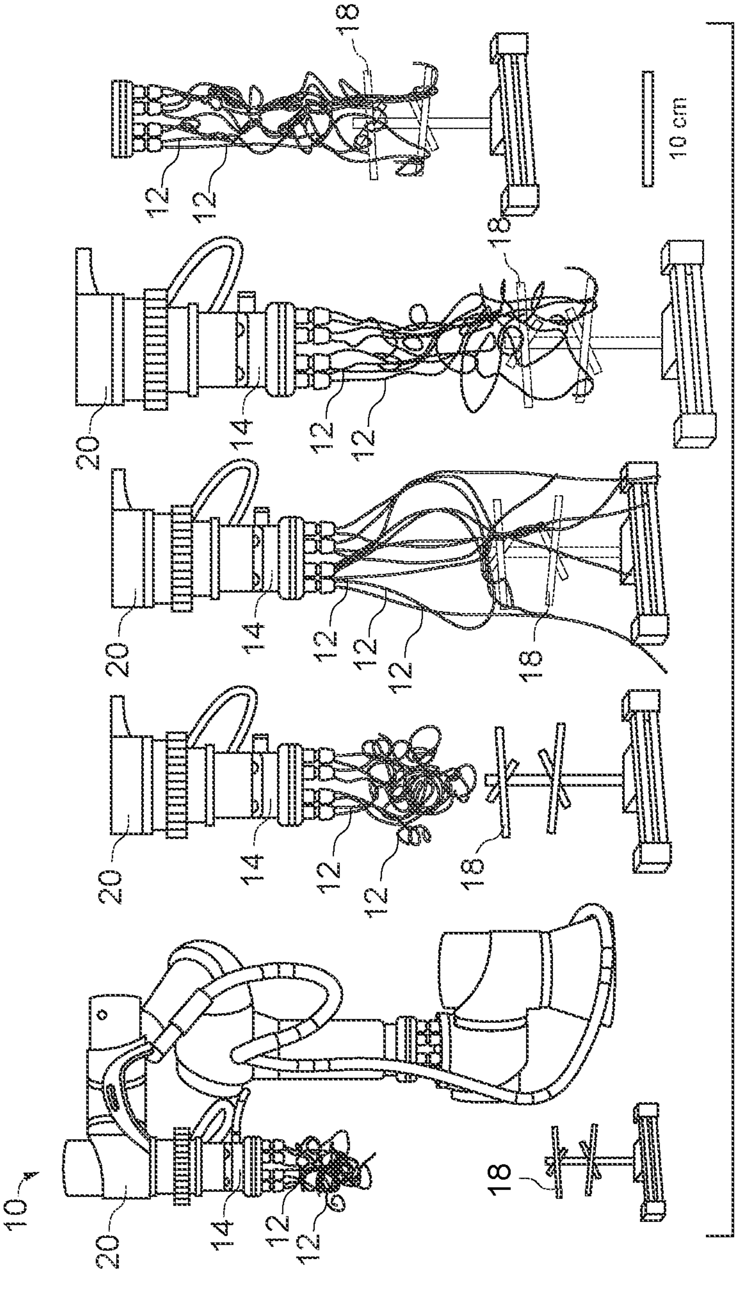
Figure 9:
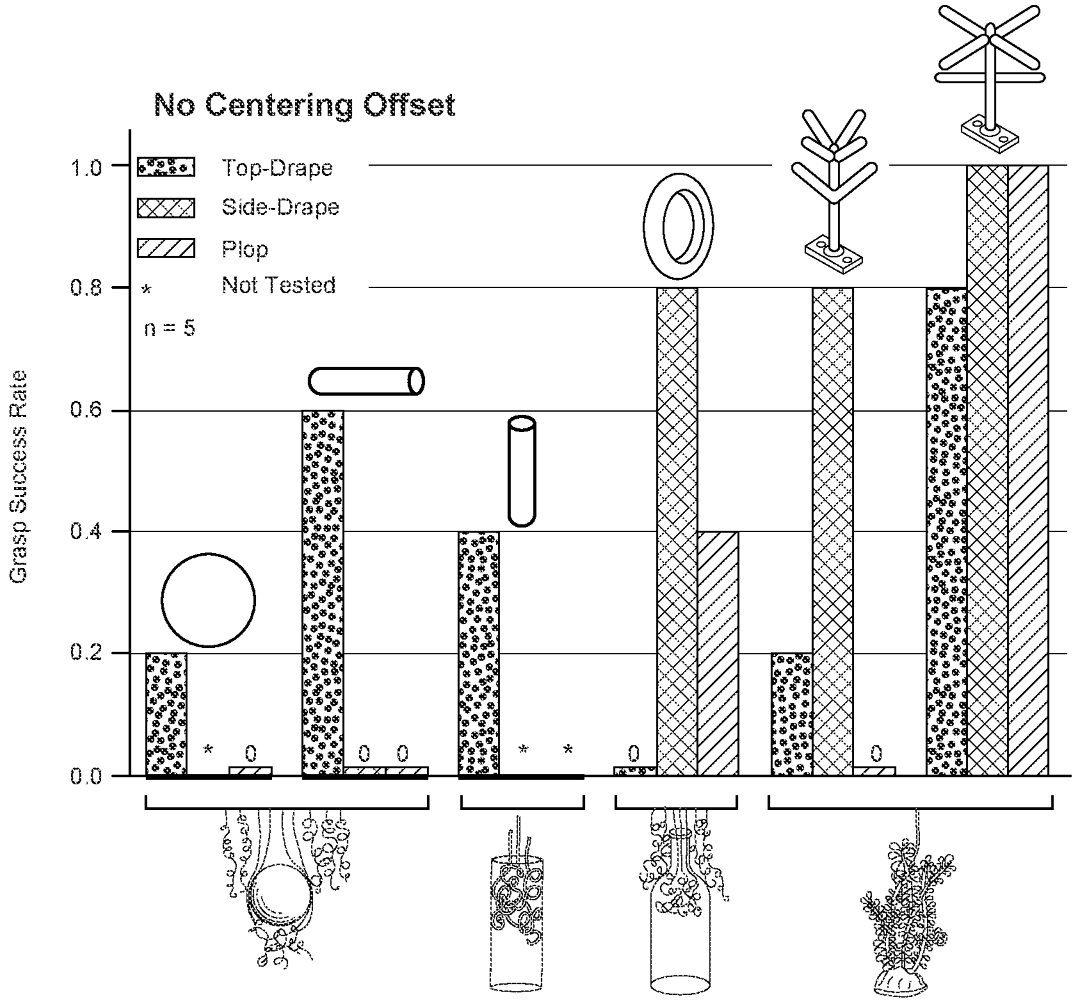
FIG. 9 plots the grasp success rate for target objects with different morphological complexities for the three approach trajectories shown in FIGS. 6-8.

We evaluate the efficacy of a grasp minimally in terms of successfully lifting and moving an object 18 from its initial to its final position. This evaluation involves varying the initial approach and interaction with a target object 18 of varying complexity and addressing uncertainty in both of these steps. For this evaluation, three heuristic grasping approach trajectories were evaluated on objects 18 of varying complexity. For target objects 18, we chose a sphere, a hollow cylinder, a torus, and a branched structure; and, for trajectories, we tried three natural steps: draping from the top ("top drape," shown in FIG. 6), draping from the side ("side drape," shown in FIG. 7), and dropping from the top ("plop on top," shown in FIG. 8), wherein the object's initial pose remains constant for all tests. These strategies were tested using a robot arm (a UR5e robot arm from Universal Robots) with five grasp trials per strategy and object, with each object 18 centered on a table below the grasper 10; and the results are shown in FIG. 9. Overall, the top-drape approach strategy had the highest success rate for both simple and complex objects, whereas all other approach strategies failed to grasp the three simplest objects. The side-drape grasp did, however, outperform the other two trajectories in grasping the simple branched structures and could potentially compensate for centering errors. Accordingly, grasps on morphologically complex objects are very successful, particularly with a side-drape grasp. Conversely, the grasper has a lower success rate when attempting to grasp simple objects, with only a top-drape grasp producing successful grasps for the three simplest objects.

Figure 10:
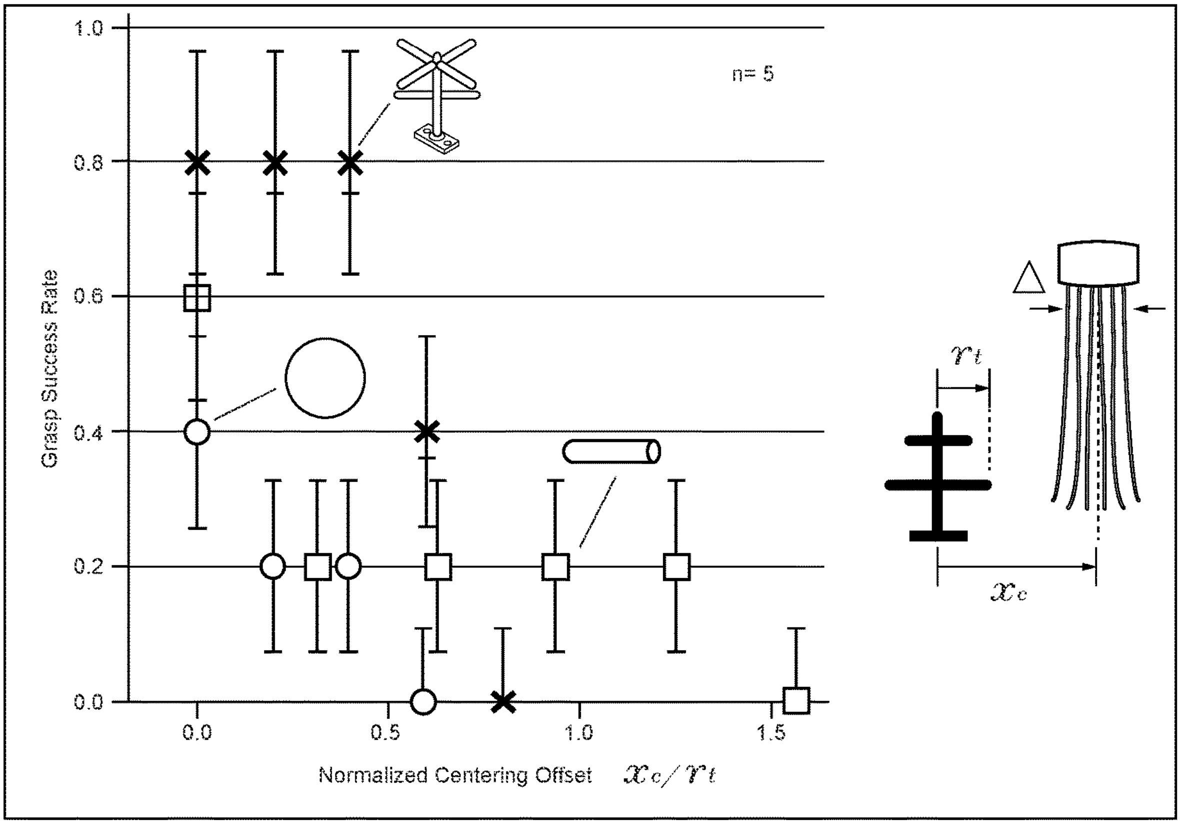
FIG. 10 plots the grasp success rate as a function of normalized centering offset ($x_c/r_t$) for objects of varying geometric complexity.

Using the top-drape grasp as the most broadly successful method of approach, we evaluated the entanglement grasper's sensitivity to positioning errors following the methods used in D. M. Aukes, et al., "Simulation-based tools for evaluating underactuated hand designs," 2013 IEEE International Conference on Robotics and Automation (ICRA) 2067-2073 (2013), and in N. R. Sinatra, et al., "Ultragentle manipulation of delicate structures using a soft robotic gripper," 4 Science Robotics 1-11 (28 Aug. 2019). Using a subset of objects (i.e., a sphere, a cylinder, and a branched structure), we performed grasps with controlled centering offsets in increments of 10 mm and measured the resulting grasp success rate over five trials at each location. The results of these experiments are shown in FIG. 10 as a function of the offset between the center axis of the grasper and the center axis of the target object (normalized to the object radius). Overall, we found that complex objects are tolerant to large centering errors. In particular, top-drape grasps on complex objects are robust to centering errors up to 0.5× the object diameter. Our empirical investigation of grasping performance using non-deterministic entanglement is particularly successful in grasping topologically and geometrically complex objects without the need for planning but has trouble with simpler objects, such as spheres and vertical tubes, where traditional deterministic graspers work well, e.g., the seminal Yale-CMU-Berkeley (YCB) object set of generally cylindrical, spherical, and cuboidal targets.

A secure grasp must be adaptive and strong. The collective softness of the entangled filaments provides the former. To characterize the strength of our grasper in the top-drape mode, we attached an object rigidly to the frame of an Instron universal testing machine (from Instron Corporation of Norwood, MA, USA) and measured the grasper force or entanglement force opposing object pull-out. For the same grasper with filaments and an operating pressure of 25 psi (172 kPa), the force-displacement curve was measured. We found that the maximum grasping forces achieved over the various objects was 27.6 N, which is comparable to many robotic hands with soft, pneumatic fingers operating at similar pressures. While grip strength is a standard metric for robotic graspers, we propose that a more comprehensive metric is the toughness of a grasp—i.e., the energy required to break it. Grasp toughness is evaluated by the work done during a pull-out test, and scales with the bending energy to straighten the filaments and also depends on the topological complexity of the target object and the level of entanglement. Grasp toughness values for the entangling 12-filament grasper tested in this work ranged from 10 mJ for a 10-cm sphere to 158-to-380 mJ for a simple branched structure to 770 mJ for a vertical 51-mm cylinder. For comparison, values for the grasp toughness of other recently developed soft graspers holding on to cylinders with diameters of 51-76 mm are 200 mJ, 300 mJ, and 750 mJ.

To quantify the topological mechanics of robust grasping via collective filament entanglement, we now turn to a combination of scaling principles and numerical simulation. The characteristic curvature, κ, of an actuated filament subject to pressure, p, scales as $\kappa \sim p(1-\delta)^2\varepsilon/rE$ and follows from a simple torque balance. For grasping in the absence of gravity (e.g., in an aquatic environment), the radius of curvature of a filament, $R \sim \kappa^{-1}$, must be smaller than the overall size of the target, $R_t$, and furthermore the length of the filament, l, must satisfy $l \geq R_t$ to enable distributed contact. This is a conservative estimate, since in an array of filaments of areal density, $\Phi_g$, it may be possible to collectively entangle with the target since the effective curvature of a tangle will scale as $\kappa f(\Phi_g)$ where $f(\Phi_g) \geq 1$ is a function that depends on the details of the filament array geometry. Therefore, a simple scaling relation for entanglement grasping via an array of long actuated filaments is given by $pR_t(1-\delta)^2 \varepsilon f(\phi_g) \leq /rE \geq 1$. The former estimate ignores the effect of gravity and is thus valid in aquatic regimes. In terrestrial environments, an additional condition is that the weight of the target must be supported by the entanglement, so that $$pR_t^4 g \leq Er^3 p(1-\delta)^2 \varepsilon f(\phi_g),$$

a scaling result that follows from the balance between elastic and gravitational torques. These two scaling estimates characterize the geometric and mechanical requirements for grasping.

To go beyond these scaling ideas, we use numerical simulations of a director-based Cosserat continuum framework for slender filamentous objects to explore the mechanics of rods capable of bend, twist, stretch, and shear deformation modes, all necessary to follow the geometrically nonlinear deformations of our elastomeric filamentous actuators. The governing nonlinear partial differential equations are a consequence of linear and angular momentum balance at each filament cross-section, taking into account internal force and torque resultants and external forces and torques (including inter-filament contact, friction from sliding contact, gravity, and internal viscous and external energy dissipation); these are then discretized and solved numerically. The actuation of the filaments is replicated by introducing an intrinsic curvature everywhere along the length of the filaments at the instant of actuation, ignoring the dynamics of a propagating actuation scheme; this is tantamount to assuming that the actuated shape equilibrates fast relative to the dynamics of entanglement or contact creation with the target. In a gravitational field, where the filaments are straight and suspended from one end, upon actuation, the grasper filaments curl into helices and make contact with other filaments and the target, leading to a soft entangled grasp.

Figure 11:
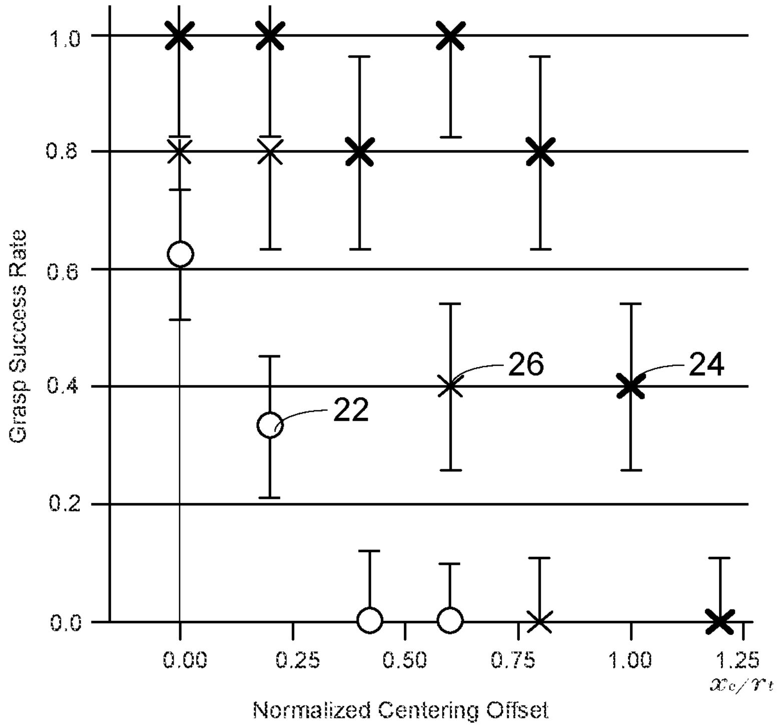
FIG. 11 plots experimental and simulated position error sensitivity while grasping a 52-g eight-branch tree test object (shown both for a simulation 22 and experimentally 24 in comparison to the experimental results for a 148-g eight-branch tree 26.

FIGS. 11-14 show the results of simulated entanglement performance compared with physical testing benchmarks. Although our simulation framework does not account for the effects of static friction or electrostatic forces due to charge build-up in sliding filaments, it is still capable of capturing the qualitative aspects of entanglement-mediated grasping, replicating experimental observations, as shown in FIG. 11, which is a plot of the experimental and simulated position error sensitivity while grasping a 52-g eight-branch tree test object in comparison to the results from the scenario shown in FIG. 10 with a 148-g eight-branch tree. We also show the ability of our simulation framework to tangle with and lift a branched structure using a top-drape grasp, as shown via the results illustrated in FIG. 11, remaining successful until the scaled offset is as large as 30% of the target size, a conservative estimate given that we have not accounted for frictional effects in the simulations. As is further discussed below, a comparison of the experimental and simulated grasps is found in FIGS. 12 and 13, which show examples of contact distributions when the entanglement grasper holds a 52-g eight-branch tree in a physical test (FIG. 12) and a simulated test (FIG. 13), and where contacts are indicated and sorted by the number of contacts made by unique filaments. In both examples shown, 14 contacts are made with eight unique filaments from an array of 12 filaments.

Figure 14:
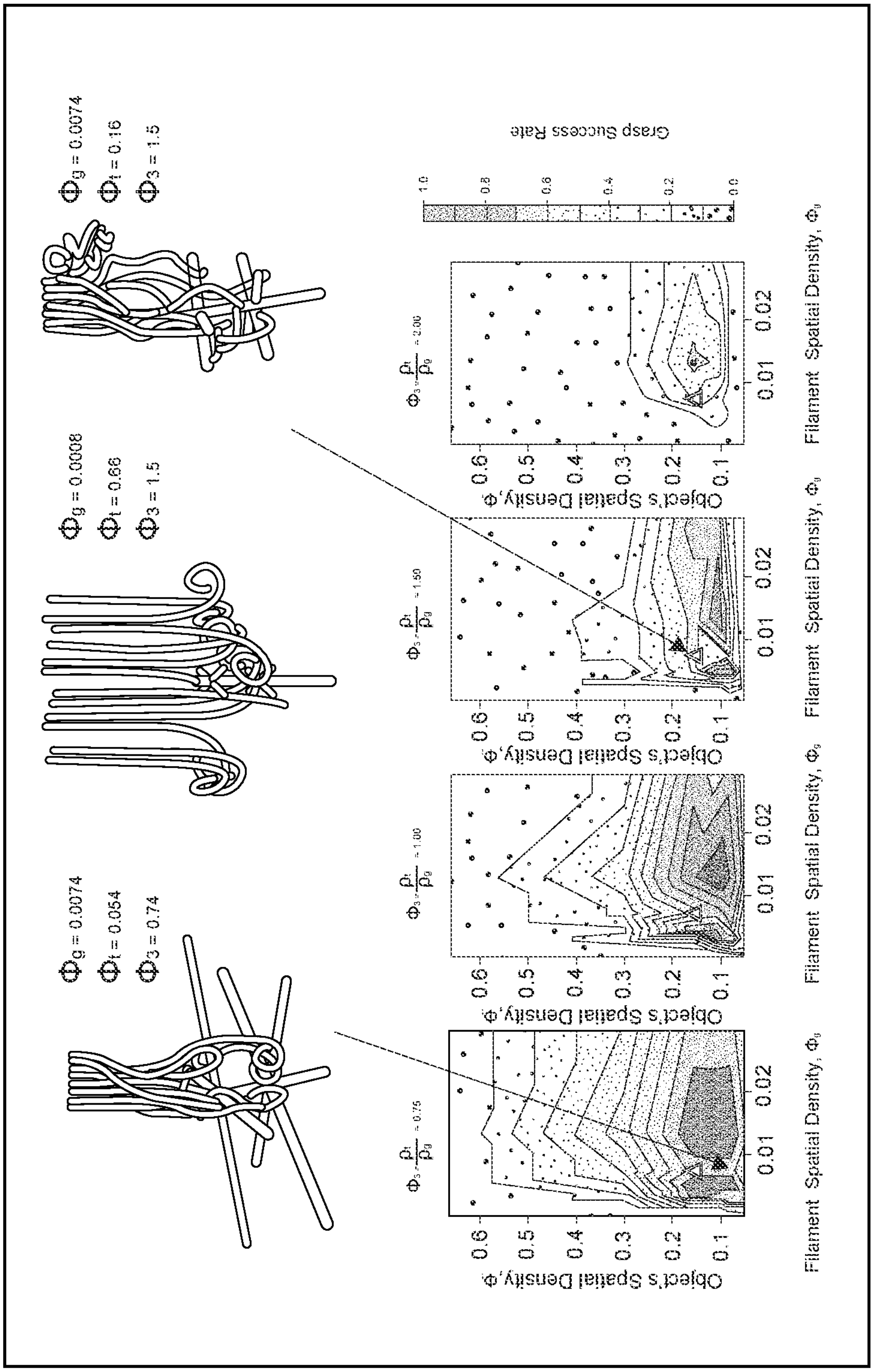
FIG. 14 show examples of simulated trials of varying target size, filament spacing, and object density in the top row followed by plots of success rates (shown via different dot shadings) of simulated grasp tests assuming perfect centering over the eight-branch test object with varying grasper-filament spacing and branch length and for four densities of the test object, wherein the filament spatial density, $\Phi_g$, is plotted along the horizontal axis; the object's spatial density, $\Phi_t$, is plotted along the vertical axis; and the ratio, $\Phi_3$, of the density of the target object, $\rho_t$, to the density of the grasper filaments, $\rho_g$, is indicated above the charts.

With the ability of the simulation to capture the topological and geometric complexity of entanglement grasping, we turn to explore the design space around the twelve-filament prototype grasper in terms of a phase space that spans the ratio of the target object spatial density, $\Phi_t$, the filament spatial density, $\Phi_g$, and a ratio, $\Phi_3$, of the density of the target object, $\rho_t$, to the density of the grasper filaments, $\rho_g$. Examples of these simulated trials with varying parameters (i.e., target size, filament spacing, and object density) are shown in the top images of FIG. 14 as well as in their location on four planes of this phase space, as shown in the plots below these images in FIG. 14. Each point on these plots in FIG. 14 represents the results of seven trial runs of a simulated object grasp-and-pickup of an eight-branch structure, such as the one used in the physical testing. The indicated success rates of simulated grasp tests assuming perfect centering over the eight-branch test object with varying grasper filament spacing, branch length, and four densities of the test object. The prototype and object parameters used in physical testing are indicated by the white triangle. An individual trial was considered successful if the object was lifted off the ground and remained suspended after 60 seconds of the simulated time. The contour plot shows the success rate at the individual points and interpolates the predicted success rate between trial points using a Delaunay triangulation.

Secure grasping of an object in both animate (human) and inanimate (robotic) settings requires a characterization of the size, shape, mass distribution, and stiffness of the target, and suggests crucial roles for perception, planning, and action with feedback. Here, we demonstrate that an embodied solution to this problem, relying on the flexible topology and geometry of the grasper, leads to adaptable grasping without perception, planning, or feedback. We instantiate this flexible grasper using an array of slender, pneumatically actuated filaments that can entangle, wrap, or cradle target objects via distributed soft contacts. We deploy the entangling filament grasper to pick up targets with a range of sizes, topological complexities, geometric shapes, and mechanical flexibilities and characterize its performance in terms of phase diagrams. These diagrams are meant to be an initial exploration of the design space of hardware for entanglement grasping. A scaling and computational framework for entangling thin elastic filaments corroborates our experimental observations and phase diagrams. Altogether, our approach to the problem of robotic grasping complements traditional solutions using graspers with a few degrees of freedom but complex feedback control strategies, with infinite-dimensional graspers that are morphologically complex but without feedback. This ability to use complex morphology (geometry and topology) and dynamics (physics) and simple control rather than anthropomorphic morphology and complex control strategies will expand the range of objects conducive to robotic grasping.

In various exemplifications, the apparatus, including the filaments, can be custom-made (with particular selections made, e.g., for the number of filaments, filament stiffness, filament curvature, filament thickness, filament length, etc.) to fit and optimally interact with a particular object to be handled.

EXEMPLIFICATIONS

The grasper used for physical tests in this work included twelve silicone filaments attached to a discrete 3D-printed palm (manifold). The use of filaments discrete from the manifold allows for isolated component replacements if, e.g., one filament leaks. The filaments in this exemplification were approximately 260 mm in length and 4.5 mm in diameter prior to actuation. The filaments were mounted to polypropylene-and-nylon luer-lock-plug-to-barb fittings (MCMASTER PN51525K141 and PN51525K121 fittings from McMaster-Carr of Santa Fe Springs, California, USA) on one end and sealed at the other end. The luer lock fittings mounted in the end of the filaments were attached to a 3D-printed manifold via nickel-coated brass-threaded luer lock sockets (MCMASTER PN51465K161 sockets from McMaster-Carr). This configuration allowed for modular repairs and replacing individual filaments in the case of a leak and is in contrast to recent work where the filaments were fabricated as part of an integrated soft structure. The individual ports on the manifold can also be closed with luer lock end plugs (MCMASTER PN51525K311 plugs from McMaster-Carr) for fewer numbers of filaments and can be easily rearranged for different array formations, although the testing in this study utilized all twelve ports for all experiments.

The manifold was printed in a semi-transparent resin (VEROCLEAR OBJ-03271 resin from Stratasys Ltd. of Eden Prairie, Minnesota, USA) using a Stratasys POLYJET 3D printer. Three different mounting attachments were used for (1) mounting to the robot arm for grasp testing, (2) mounting in the materials characterization system (an INSTRON 5544A tensile tester from Instron Corp. of Norwood, Massachusetts, USA) for grip-strength tests, and (3) mounting on a remotely operated vehicle (ROV) for deep-sea tests. For all tests, however, the configuration of the ports on the distal portion of the grasper remained the same. The ports were evenly spaced in two concentric circles. The outer circle had a diameter of 50 mm and included eight of the twelve ports, while the inner circle had a diameter of 25 mm and included the remaining four of the twelve filaments.

The actuators in this work were made from ELASTOSIL M 4601 silicone rubber (from Wacker Chemie AG of Munich, Germany) because of its high elongation to failure (700%), high tearing force, and relatively low cost. The silicone-rubber filaments were formed by dip molding silicone onto 305-mm (12-in) long stainless-steel pins (MCMASTER 88915K11 pins from McMaster-Carr). The pins (or rods) are coated with liquid silicone rubber and then fixed at a 10-degree angle from vertical until the silicone rubber is cured to create a thicker coating on one side of the pin. For the fabrication of the filaments, it was easier to suspend the pins from above. For successive coatings, the pins remained suspended between coatings. The filaments used for the tests in this study were formed with four coatings on pins that were oriented at 10 degrees from vertical. Once the silicone is cured and the pin is removed, the silicone forms a filament tube that has a thicker wall on one side where the coating pooled due to gravity. The silicone rubber does not stick to the stainless-steel pins and can be removed without the use of mold release, which is advantageous because a mold release could migrate during dipping and would thus create a risk of causing the formation of thin spots and holes in the sidewalls of the filaments.

To ease the release of filaments off a longer pin, the pin was pulled off the dipping fixture, and the end of each silicone coating was trimmed while the silicone coating was still on the pin. Removal of the silicone from the pin was aided by 15-30 psi (103-207 kPa) of air pressure applied via a 1/16-in hose barb inserted into one side of the silicone. This insertion does not create a perfect seal but supplies enough internal pressure to cause the filaments to expand and slip off the pin more easily. This demolding pressure may be modulated depending on the operating pressure of the filament actuators. Care was taken to apply tension to the actuator during removal from the pin so that, if the barb slipped and the internal pressure dropped, the filament did not snap back and stretch over the tip of the pin, potentially creating a weak spot or pinhole.

For shorter pins, the full length of the pin may be dipped in a cup of liquid silicone rubber and allowed to cure. For long pins, to avoid the need for large dipping vessels and wasted silicone rubber, a cup with a hole in the bottom was used for the dip coating process. To help with this modified dip coating process for long pins, the pins were suspended from above. The cup was held at the top of the pin, filled with uncured silicone rubber, slowly pulled down the length of the pin, and removed from the lower free end of the pin.

Various fabrication variables can be altered to tune the functionality of the filament actuators, but the recipe used for the filaments tested here was four dips of coating of the ELASTOSIL silicone rubber, mixed with a 9:1 weight ratio, as directed by the product information. The silicone rubber was mixed for two rounds of 3*o* seconds at 2000 revolutions per minute (rpm) in a THINKY mixer (from Thinky U.S.A., Inc., of Laguna Hills, CA) and immediately applied to the pins and then allowed to cure at room temperature before adding another layer. The pins were fixed at an angle of ten degrees from vertical until fully cured.

After removing the filaments from their forming pins, one end was sealed using SIL-POXY silicone rubber adhesive (from Smooth-On Inc. of Macungie, Pennsylvania, USA) or newly mixed ELASTOSIL silicone rubber. For filaments used in a deep-sea field test, 1/16-in diameter, 1/4-in long steel pins were inserted into this end of the filament before sealing it. The insertion of the pins served the purpose of weighting the ends of the filaments to make them settle down faster after being moved through the water. The filaments otherwise drift in the water and are harder to direct. The pins also allowed the ends of the filaments to stick to a magnet on the holster of the remotely operated vehicle (ROV) to keep them from drifting around until deployment. The remaining end of the filament was fixed onto a plastic 1/16-in Luer-lock barb (part listed above) and secured with SIL-PDXY silicone rubber adhesive and a wrapping of cotton twine (MCMASTER PN1929T12 twine from McMaster-Carr). After all of the SIL-PDXY silicone rubber adhesive and rubber is fully set, the Luer-lock fitting can then be attached to the grasper manifold, as described above.

Figure 20:
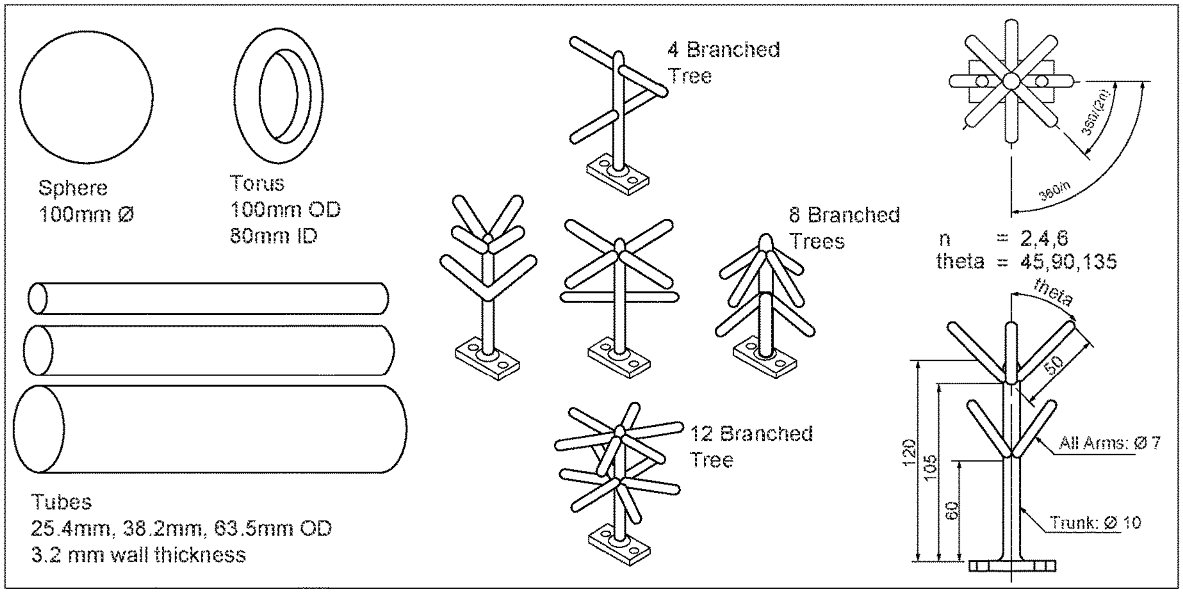
FIG. 20 shows the set of objects used for testing as well as engineering drawings for one of the branched structures.

The object set used for the experimental testing in this study is shown in FIG. 20; and the object masses, materials, and characteristic dimensions are listed in Table 1, below. The set of target objects used in testing and shown in FIG. 20 include a sphere; a torus; tubes; and 4-, 8-, and 12-branched trees. The dimensions and weights of the objects are listed in Table 1. Not shown are the aluminum bars that were attached to the bottom of the tree structures for added weight for the robot-arm grasp tests. These aluminum bars are visible in FIG. 8. Additionally, the dimensions (in mm and deg.) for one of the branched structures are shown in an engineering drawing on the right side of FIG. 20. The number and angle of the branches change for the other structures while all other dimensions are held constant.

The tubes and sphere were selected to represent a few variants on simple geometric primitives similar to the YCB object set. The torus and branched structures were included to introduce a set of objects for testing that are more topologically complex. The simple branched structures are more complex than the objects in the YCB object set but simple enough to be reproduced on widely available fused deposition modeling (FDM) printers and simple enough to be implemented in simulations without high computational cost. In addition to the branched structures discussed in the main text, further variants are included in FIG. 20 and Table 1. These variants and additional testing performed with them are discussed below.

TABLE 1

| Object | Dimensions (mm) | Mass (g) | Material |
|---|---|---|---|
| Sphere | 100 diameter | 10 | STYROFOAM closed-cell polystyrene foam from DuPont |
| Tube | 25 outer diameter (OD) × 300 length | 43 | polycarbonate |
| Tube | 25 OD × 300 length | 91 | polycarbonate |
| Tube | 64 OD × 300 length | 130 | polycarbonate |
| Torus | 80 ID × 120 height | 69 | polylactic acid (PLA) (3D printed) |
| Tree (8 branches, 45 deg) | 80 width × 120 height | 147 | PLA + aluminum base |
| Tree (8 branches, 90 deg) | 100 width × 100 height | 148 | PLA + aluminum base |
| Tree (8 branches, 135 deg) | 80 width × 120 height | 147 | PLA + aluminum base |
| Tree (4 branches, 90 deg) | 100 width × 120 height | 144 | PLA + aluminum base |
| Tree (12 branches, 90 deg) | 100 width × 120 height | 153 | PLA + aluminum base |

Within the set of simple branched structures (trees), used for testing, we explored the effect of two geometric parameters, branch angle and branch number, on the grasping success with the entanglement grasping strategy. The number of branches (distributed evenly between two rings on the trunk) and the angle between branches and the trunk were varied, as shown in FIG. 20 and Table 1. The other characteristic dimensions were held constant, including the trunk height of 120 mm, the trunk diameter of 10 mm, the branch diameter of 7 mm, and the location of branching points at 60 mm and 105 mm (from the bottom of the trunk to the bottom of the branches). The trees with eight branches at a 90-degree angle to the trunk and eight branches tilted upward at a 45-degree angle were included in the testing, described in the main text. The additional trees were used as target objects in similar tests where a top drape approach was used, and where perfected object centering was assumed. The results of these tests are discussed in the extended grasp strategy testing section, below.

In addition to the set of objects used for laboratory grasp tests and for simulated grasp tests, the grasper was tested on target objects using a remotely operated arm and ROV in a deep-sea field test evaluation. This context adds the complications of a different surrounding fluid, currents, unpredictable target objects, and limited testing vision and feedback. A twelve-filament array like the set used for the laboratory and the simulated grasp-success testing was successfully used to pick up a benthic sea star at a depth of 800 m, which was then released after grasping. Development of the entanglement grasper was originally motivated by the challenging grasping tasks in the deep sea, where the gentle grasps of deep-sea life and precious artifacts cannot be done by human hands due to the hydrostatic pressure.

While the filament grasper was originally inspired by challenging deep-sea grasping tasks, the authors believe that entanglement grasping can also augment the abilities of robotic grasping with everyday objects on land, which is the primary focus of this work. As discussed, above, we began initial testing with a small subset of target objects. The entanglement grasping techniques were also demonstrated for familiar household objects that might prove more challenging for the vast majority of previous robotic graspers, including an array of houseplants, irregularly shaped toys, and a flexible phone tripod. The grasping demonstrations were not performed with a robot arm. To emulate a top drape approach while allowing the grasper to remain in a static position, the object was manually raised up into the array of unactuated filaments, and the filaments were then pneumatically actuated around the object with an increase in operating pressure to 25 psi (172 kPa).

We evaluated the performance of entanglement grasping using a task-based experimental and simulation approach. Analytical frameworks used to understand and plan grasps, such as form and force closure, and contact-curvature analysis become intractable with the large degree of randomness in contact interactions that entanglement relies upon. Experimental- and simulation-based evaluations allow for comparison with similar experimental studies used to evaluate traditional graspers. In defining an appropriate task, we use the common definition of a stable grasp: a grasp is statically stable if the grasped object is in static equilibrium. Additionally, a common practical definition of grasp success during a manipulation task is used as a proxy for grasp stability because the actual force balance is intractable to measure in hardware: a grasp is successful if the target object is able to be moved from its initial position to a desired location without being dropped.

Figure 21:
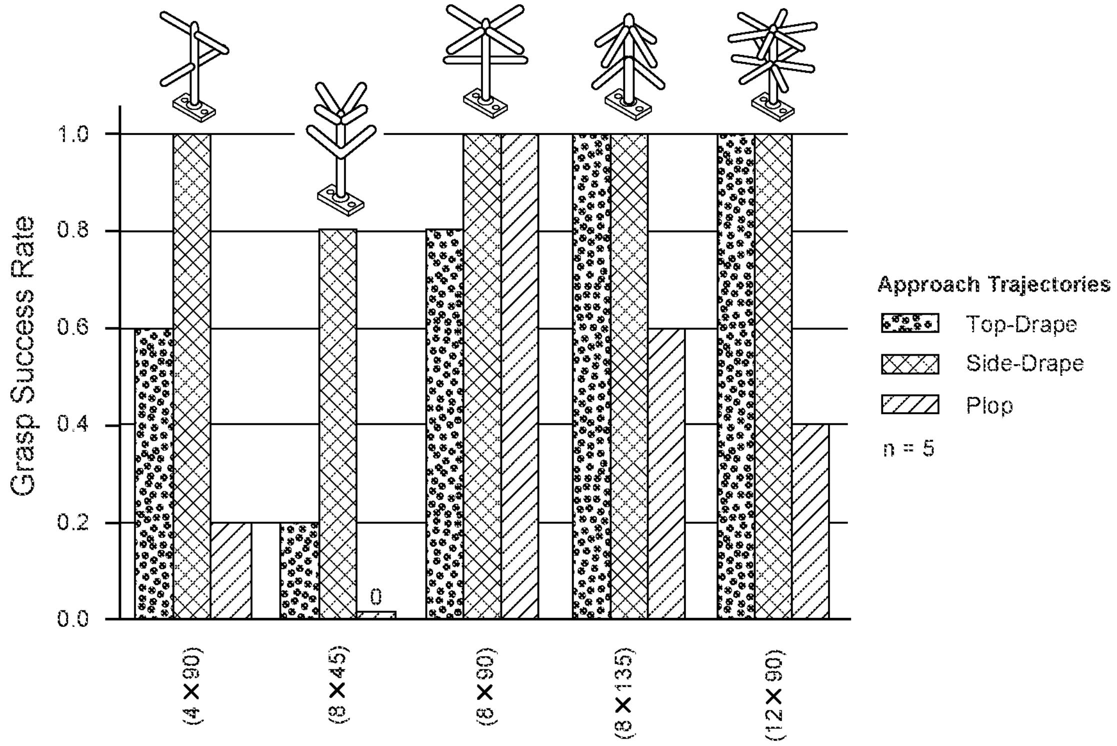
FIG. 21 plots the following three heuristic grasping approach trajectories: top-drape (left), side-drape (middle), and plop (right), which were evaluated on the set of branched objects using the same procedures as for the tests represented in FIG. 9.
Figure 22:
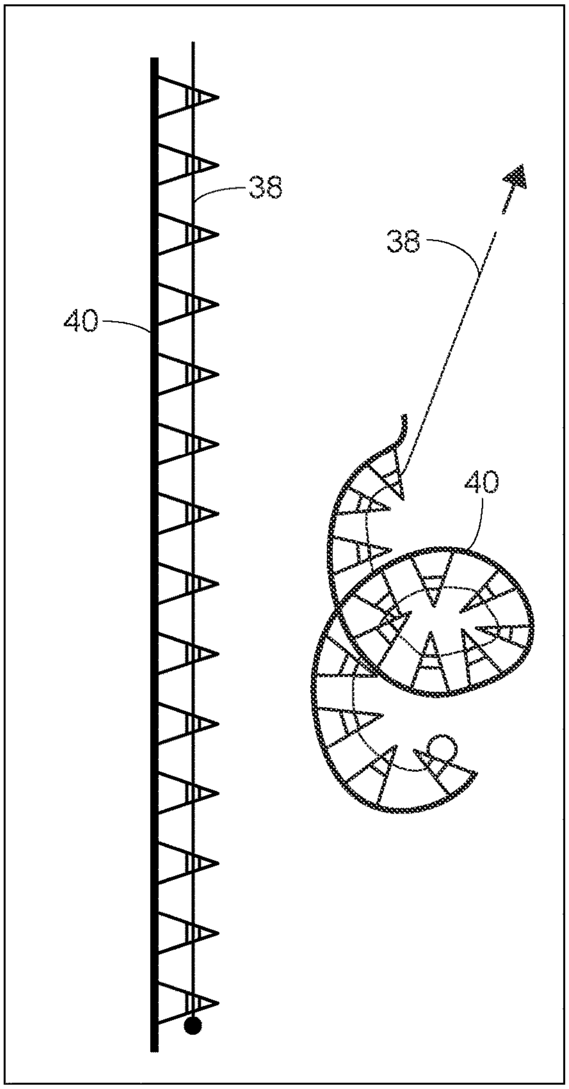
FIG. 22 is an illustration of a tendon-driven filament 12 that actuated by retracting (upwardly in the orientation shown) a tendon that passes through the through holes of a filament with a flexible support structure **4*o*** that is contiguous only on one side in relaxed (unretracted, at left) and curled (retracted, at right) states.
Figure 23:
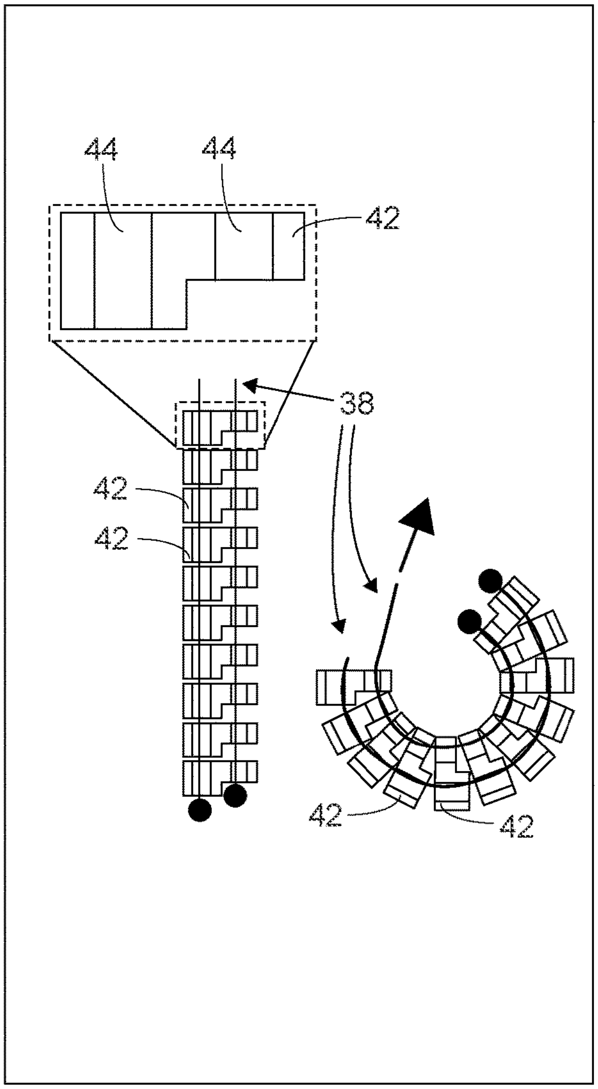
FIG. 23 is an illustration of another exemplification of a tendon-driven filament with a segmented support structure (formed of a rigid or flexible material), wherein an array of rigid parts 42 with through holes 44 is formed on/positioned about the tendon 38, forming a high-aspect-ratio actuator. More parts can be added to increase the overall strength of the grasper.

The first grasp tests performed, as described, above, evaluated three heuristic grasping approach strategies, including the top drape, side-drape, and plop-on-top grasps. A subset of the objects is described above, and additional results for the illustrated branched structure variants and the grasp performance achieved with the three approach strategies are shown in FIG. 21. As with the tests presented in the main text, ideal conditions were assumed where the location of a target object is known and is centered with respect to the array of filaments in each of these additional tests. As with the previous tests, a top-drape approach involved a slow lowering of the filaments onto the object, and then actuation occurs; in a side-drape approach, the filaments were lowered next to the object and then horizontally translated in the direction of the object to 50 mm past the center point of the object; and, in a plop-on-top approach, the filaments were first actuated above the object before being lowered to the intended grasp height and then released to fall around the object and actuated again for a grasp.

As can be seen in FIG. 21, the side-drape approach strategy gave the highest performance for all branched structures, with 100% grasp success rate for all but the eight-branched tree with a 45-degree branch angle. The top-drape approach achieved higher performance for objects with more branches. The plop-on-top approach worked well for the tree with eight branches and a branch angle of 90 deg, but performance dropped off as both the number of branches and the angle of branches changed, up or down.

Most of the tests with graspers mounted on robot arms were performed with the tips of the filaments approximately aligned with the surface of the table. FIG. 11, however, shows another set of data taken from a physical centering test where the filaments were lowered −80 mm below the point where they touched the table. This produced a significant increase in performance, where the graspers were able to retrieve the tree some portion of the time up to 50 mm away from the center position (100% of the object radius). Some of the performance increase may be explained by the fact that, upon hitting the table, the filaments can splay outward, effectively extending their horizontal reach.

For repeatable and tunable actuation of the filaments in the robot-arm-mounted grasp testing, the input pressure of the filament grasper was controlled by a pneumatic-pressure control system. The controller enables execution of arbitrary pressure trajectories in real time with an accuracy of 1.4 kPa. The working control range is between −35 kPa and 350 kPa, and preliminary testing shows this system has a response time of approximately 0.2 seconds, enabling high-bandwidth operation.

As presented above, grasping-force tests were performed on an INSTRON material testing machine. Only top-drape approaches were performed because of the configuration limitations of the testing frame. The objects were also rigidly anchored, which was not true in the grasp success trials with the robot arm; but the rigid anchoring provided a benchmark of the grip strength and a quantitative measurement to compare with simulation results. A summary of the average maximum gripping values observed from each trial as well as the maximum observed values across all trials is provided in Table 2, below. The examples of the trial sets from which these values are derived include the branched structure with eight limbs, the 63.5-mm diameter horizontal tube, the 25.4-mm diameter vertical tube, and the 63.5-mm diameter vertical tube.

TABLE 2

| Object | Average maximum value [N] | Maximum of maximum values [N] |
|---|---|---|
| 4 branch tree | 3.92 | 6.03 |
| 8 branch tree | 6.86 | 16.18 |
| 12 branch tree | 9.14 | 12.66 |
| 8 upward branch tree | 2.306 | 4.68 |
| 8 downward branch tree | 5.99 | 13.42 |
| 1-inch OD tube horizontal | 6.85 | 27.64 |
| 2.5-inch OD tube horizontal | 8.65 | 34 |
| 1-inch OD tube vertical | 1.7 | 5.5 |
| 1.5-inch OD tube vertical | 6.98 | 8.64 |
| 2.5-inch OD tube horizontal | 3.77 | 9.91 |
| sphere | 0.76 | 2.06 |

As one might expect, the maximal gripping force achieved by the filament grasper was highly affected by the characteristics of the target object. Furthermore, the shape of the resulting force-versus-extension curves reflects the nature of the engagement between the filaments and the object. For example, the filaments predominantly rely on friction to hold the vertical tubes. As the object is pulled from the grasper, the forces are relatively level and show the friction forces as the object slides through the grasp of the filaments. By contrast, the trials that used the branched structure and the horizontal tube appear to have a larger degree of variation related to how many of the filaments wrapped around the tube or branches. There are also larger jumps in the data as individual filaments are pulled away and forced to release the object.

Different object sizes and shapes resulted in different grasping dynamics. For example, the filaments were draped around the outside of the 25.4-mm tube, but the 63.5-mm tube was large enough that the filaments were lowered inside the tube. As the filaments are pulled up from the object, their coils are extended, which cause the coil diameter to contract and thereby cause a slight increase in forces as the filaments squeeze the outside of the smaller tube and decrease forces as the filaments pull away from the inner wall of the larger tube.

Figure 12:
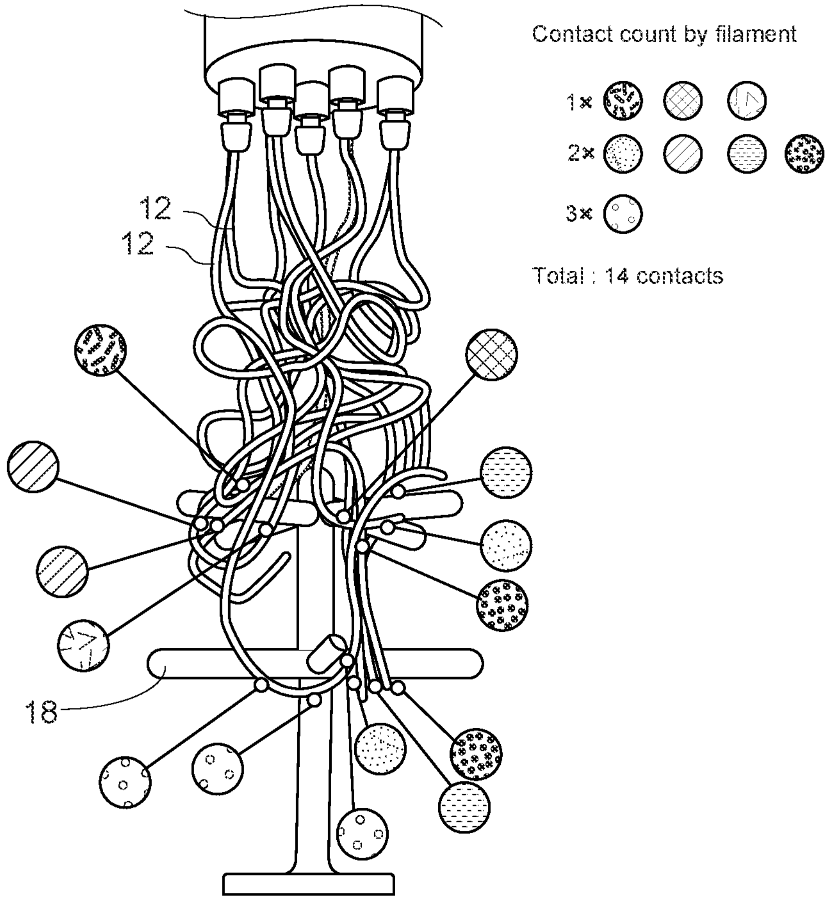
FIG. 12 shows an example of contact distributions for individual filaments 12 (with contact locations numbered and illustrated with a distinct fill for each filament) when the entanglement grasper holds a 52-g eight-branch tree 18 in a physical test with a total of 14 points of contact.
Figure 13:
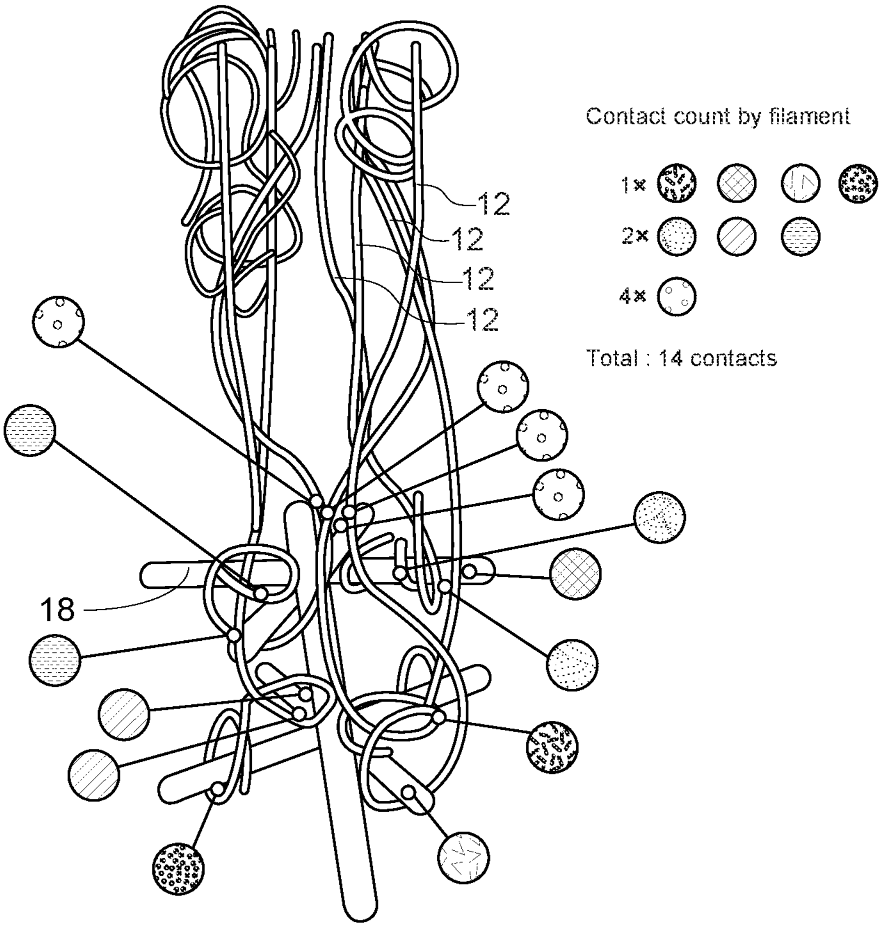
FIG. 13 shows contact distributions for individual filaments 12 when the entanglement grasper holds a 52-g eight-branch tree 18 in a simulated test with a total of 14 points of contact.

Randomly distributed contact points are a distinguishing feature of entanglement grasping with the filament grasper. This phenomenon is difficult and time-consuming to quantify in physical experiments but relatively easy to pull out of the simulation environment. For comparison between simulations and physical testing, we manually counted contact points on the four- and eight-branch tree objects, as shown in FIGS. 12 and 13. The grasper was mounted onto a frame on top of a rotating platform, and five pictures of the example grasps were taken at 45-degree increments. The camera remained stationary while the platform supporting the grasper and support structure were rotated. The objects 18 were manually raised into the filaments 12 to simulate a top-drape approach with the fixed grasper mount. The contacts were grouped by filament 12, as indicated by the respective patterns, as shown in FIGS. 12 and 13. Individual contact points between the filaments 12 and object 18 were visible in multiple views.

The contacts from the pictured grasp of the eight-branch object 18 are shown in FIG. 12 along with an example of a simulated grasp of an eight-branch object 18 in FIG. 13. In these examples, fourteen contact points are made by eight of the twelve grasper filaments 12. The range of contact points observed from successful grasp simulations was 11 to 32 discrete points of contact. This range of contacts was pulled from the results of the grasp-test simulations represented in FIG. 13, where the density and branch length of the eight-branch tree and grasper-filament spacing were varied. Not all contacts counted were necessarily load bearing, as can be inferred by the examples in FIG. 12; but this suggests that, for a given filament strength, there is a critical threshold of engagement or contacts that leads to a successful grasp and that the number of contact points increases with target-object weight. We have observed successful grasps with lower numbers of contacts from physical testing, but this success is dependent on the object weight and static friction, which is not represented in the simulation. The entanglement grasper performance and contact also changes with the shape of the object 18.

In describing embodiments, herein, specific terminology is used for the sake of clarity. For the purpose of description, specific terms are intended to at least include technical and functional equivalents that operate in a similar manner to accomplish a similar result. Additionally, in some instances where a particular embodiment includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments, those parameters or values can be adjusted up or down by $1/100^{th}$, $1/50^{th}$, $1/20^{th}$, $1/10^{th}$, $1/5^{th}$, $1/3^{rd}$, 1/2, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof or within a range of the specified parameter up to or down to any of the variations specified above (e.g., for a specified parameter of 100 and a variation of $1/100^{th}$, the value of the parameter may be in a range from 0.99 to 1.01), unless otherwise specified. Further still, where methods are recited and where steps/stages are recited in a particular order—with or without sequenced prefacing characters added for ease of reference—the steps/stages are not to be interpreted as being temporally limited to the order in which they are recited unless otherwise specified or implied by the terms and phrasing.

This invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements, and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention.

What is claimed is:

1. A method for grasping objects via entanglement of an array of elongated filaments, the method comprising:

utilizing a soft-robotic grasper, comprising (a) a manifold that includes an inlet port and a plurality of outlet ports in fluid communication with the inlet port and (b) a plurality of elongated filaments, each elongated filament having a length-to-thickness ratio of at least 20, wherein each elongated filament is coupled in fluidic communication with a respective outlet port of the manifold, wherein each elongated filament defines an interior hollow channel into which a pressurized fluid is configured to be pumped through the respective outlet port with which it is coupled, and wherein each elongated filament is mechanically programmed to undergo a curling displacement when pressurized fluid is pumped into its interior hollow channel;

positioning the soft-robotic grasper such that the elongated filaments contact an external object;

pumping a fluid through the inlet port of the manifold and out the outlet ports of the manifold into the interior hollow channels of the elongated filaments coupled with the outlet ports, the elongated filaments curling and mutually entangling with one another while grasping the external object; and displacing the external object by displacing the soft-robotic grasper with the external object grasped by the mutually entangled elongated filaments.

2. The method of claim 1, wherein the mechanical programming of the elongated filaments is achieved by the interior hollow channels of the elongated filaments being eccentrically located so as to provide a varying wall thickness around the perimeter of each interior hollow channel.

3. The method of claim 1, wherein the elongated filaments grasp the external object by externally or internally draping around, cradling, or conforming to the external object.

4. The method of claim 1, wherein the elongated filaments are placed in contact with the external object by draping the elongated filaments onto the external object from above the external object.

5. The method of claim 1, wherein the soft-robotic grasper grasps and displaces the external object without using feedback from a sensor.

6. The method of claim 1, wherein the external object is a living organism, a component of a living organism, or a product thereof.

7. The method of claim 6, wherein the living organism is an animal.

8. The method of claim 6, wherein the external object is a plant or a product thereof.

9. The method of claim 1, wherein the soft-robotic grasper includes at least 10 elongated filaments.

10. The method of claim 1, wherein the manifold and the plurality of elongated filaments are discrete structures.

11. The method of claim 1, wherein each elongated filament has a length-to-thickness ratio of at least 50.

12. A soft-robotic grasper, comprising:

a manifold that includes an inlet port and a plurality of outlet ports in fluid communication with the outlet ports; and a plurality of elongated filaments, each elongated filament having a length-to-thickness ratio of at least 20, wherein each elongated filament is coupled in fluidic communication with a respective outlet port of the manifold, wherein each elongated filament defines an interior hollow channel into which a pressurized fluid is configured to be pumped through the respective outlet port with which it is coupled, wherein each elongated filament is mechanically programmed to undergo a curling displacement when pressurized fluid is pumped into its interior hollow channel, and wherein the elongated filaments are spaced and configured to entangle with one another when displaced via the pumping of the pressurized fluid into the interior hollow channels of the elongated filaments.

13. The soft-robotic grasper of claim 12, wherein the mechanical programming of the elongated filaments comprises the interior hollow channels of the elongated filaments being eccentrically located so as to provide a varying wall thickness around the perimeter of each interior hollow channel.

14. The soft-robotic grasper of claim 12, wherein the soft-robotic grasper includes at least 10 elongated filaments.

15. The soft-robotic grasper of claim 12, wherein each elongated filament has a length-to-thickness ratio of at least 50.

16. A soft-robotic grasper, comprising:

a base; and a plurality of elongated filaments, each elongated filament having a length-to-thickness ratio of at least 20, wherein each elongated filament extends from the base, wherein each elongated filament defines an interior channel via which the elongated filament is configured to be actuated, wherein each elongated filament is mechanically programmed to undergo a curling displacement when actuated, and wherein the elongated filaments are spaced and configured to entangle with one another when displaced via the actuation.

17. The soft-robotic grasper of claim 16, further comprising a plurality of cables, wherein at least one of the cables extends through the interior channel of each elongated filament to actuate the elongated filaments to undergo the curling displacement when the cables are retracted.

18. The soft-robotic grasper of claim 16, wherein the base is a manifold that includes an inlet port and a plurality of outlet ports in fluid communication with the inlet port, wherein each elongated filament is coupled in fluid communication with a respective outlet port of the manifold, wherein each elongated filament defines the interior channel as an interior hollow channel into which a pressurized fluid is configured to be pumped through the respective outlet port with which it is coupled to provide the actuation.

19. The soft-robotic grasper of claim 16, wherein each elongated filament has a length-to-thickness ratio of at least 50.

* * * * *